US012335909B2

(12) United States Patent
Raj et al.

(10) Patent No.: US 12,335,909 B2
(45) Date of Patent: Jun. 17, 2025

(54) METHODS AND APPARATUS FOR WI-FI RANGING PROTOCOL ENHANCEMENT WITH REDUCED THROUGHPUT IMPACT

(71) Applicant: QUALCOMM Incorporated, San Diego, CA (US)

(72) Inventors: Rishabh Raj, Jamshedpur (IN); Ravindra Chauhan, Chennai (IN); Xiaoxin Zhang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 17/366,984

(22) Filed: Jul. 2, 2021

(65) Prior Publication Data

US 2022/0039058 A1  Feb. 3, 2022

Related U.S. Application Data

(60) Provisional application No. 63/060,330, filed on Aug. 3, 2020.

(51) Int. Cl.
*H04W 64/00* (2009.01)
*H04W 12/03* (2021.01)
(Continued)

(52) U.S. Cl.
CPC ......... *H04W 64/006* (2013.01); *H04W 12/03* (2021.01); *H04W 24/10* (2013.01); *H04W 56/009* (2013.01)

(58) Field of Classification Search
CPC ..... H04W 64/00; H04W 84/12; H04W 24/10; H04W 4/023; H04W 64/003; H04W 4/02;
(Continued)

(56) References Cited

U.S. PATENT DOCUMENTS 11,166,159 B1\* 11/2021 Berger .................. H04L 9/06
2016/0081054 A1  3/2016 Zhang et al.
(Continued)

OTHER PUBLICATIONS

International Search Report and Written Opinion—PCT/US2021/040535—ISA/EPO—dated Nov. 19, 2021.

*Primary Examiner* — Kwasi Karikari
(74) *Attorney, Agent, or Firm* — Procopio, Cory, Hargreaves & Savitch LLP

(57) ABSTRACT

Ranging operations may be performed between an initiator device and a responder device using data frames as opposed to fine timing measurement (FTM) frames or Null Data Packet (NDP) frames. An initiator device may request the responder device to perform a ranging operation. The responder device may transmit a data frame to the initiator device and may receive an acknowledgement (ACK) frame from the responder device. The responder device may transmit a second data frame to the initiator device that includes ranging measurement information for the previous message exchange, including a time of departure of the data frame and a time of arrival of the ACK frame. Because data frames are encrypted, the ranging measurement information is provided in a secure manner. Moreover, by including the ranging measurement information in data frames, throughput for the ranging procedure is improved.

26 Claims, 12 Drawing Sheets

(51) Int. Cl.
*H04W 24/10* (2009.01)
*H04W 56/00* (2009.01)

(58) Field of Classification Search
CPC ..... H04W 24/06; H04W 72/20; H04W 24/08;
H04W 4/029; H04W 56/001; H04W
16/28; H04W 52/0216; H04W 12/06;
H04W 56/006; H04W 4/025
See application file for complete search history.

(56) References Cited

U.S. PATENT DOCUMENTS

2016/0205576 A1* 7/2016 Segev .............. H04W 56/0065
370/253
2017/0149799 A1* 5/2017 Vamaraju .............. H04W 64/00
2017/0257758 A1 9/2017 Aldana et al.
2018/0011179 A1* 1/2018 Zhang ................. G01S 5/0205

* cited by examiner

METHODS AND APPARATUS FOR WI-FI RANGING PROTOCOL ENHANCEMENT WITH REDUCED THROUGHPUT IMPACT

CLAIM OF PRIORITY UNDER 35 U.S.C. § 119

This application claims under 35 USC § 119 the benefit of and priority to U.S. Provisional Application No. 63/060,330, filed Aug. 3, 2020, and entitled "METHODS AND APPARATUS FOR WI-FI RANGING PROTOCOL ENHANCEMENT WITH REDUCED THROUGHPUT IMPACT," which is assigned to the assignee hereof and is incorporated herein by reference in its entirety.

TECHNICAL FIELD

The present disclosure relates generally to wireless communications and, more particularly, to ranging operations performed between Wi-Fi enabled devices.

BACKGROUND OF RELATED ART

The recent proliferation of Wi-Fi access points in wireless local area networks (WLANs) has made it possible for navigation systems to use these access points for position determination, especially in areas where there are a large concentration of active Wi-Fi access points (e.g., urban cores, shopping centers, office buildings, and so on). For example, a client device or station (STA) such as a cell phone or tablet computer can use the round trip time (RTT) of signals transmitted to and from the access points (APs) to calculate the ranges, e.g., distances, between the STA and the APs. Once the distances between the STA and three APs are calculated, the location of the STA can be estimated using trilateration techniques.

Security in the frames transmitted between devices during ranging operations may be improved but at the cost of decreased throughput. Improvements to increase throughput, while maintaining security are desirable.

SUMMARY

Ranging operations may be performed between an initiator device and a responder device using data frames as opposed to fine timing measurement (FTM) frames or Null Data Packet (NDP) frames. An initiator device may request the responder device to perform a ranging operation. The responder device may transmit a data frame to the initiator device and may receive an acknowledgement (ACK) frame from the responder device. The responder device may transmit a second data frame to the initiator device that includes ranging measurement information for the previous message exchange, including a time of departure of the data frame and a time of arrival of the ACK frame. Because data frames are encrypted, the ranging measurement information is provided in a secure manner. Moreover, by including the ranging measurement information in data frames, throughput for the ranging procedure is improved.

In one implementation, a method performed by a first wireless communication device for ranging, includes transmitting a ranging request for a ranging procedure to a second wireless communication device; receiving a first message from the second wireless communication device based at least in part on the transmitted ranging request, the first message comprising a first data frame; transmitting a first response message to the second wireless communication device in response to the first message; receiving a second message from the second wireless communication device, the second message comprising a second data frame, wherein ranging measurement information for the first message and the first response message is encapsulated in the second data frame; and estimating a range between the first wireless communication device and the second wireless communication device based at least in part on the ranging measurement information.

In one implementation, a first wireless communication device configured for ranging, includes a wireless transceiver; at least one memory; at least one processor coupled to the wireless transceiver and the at least one memory, wherein the at least one processor is configured to: transmit, via the wireless transceiver, a ranging request for a ranging procedure to a second wireless communication device; receive, via the wireless transceiver, a first message from the second wireless communication device based at least in part on the transmitted ranging request, the first message comprising a first data frame; transmit, via the wireless transceiver, a first response message to the second wireless communication device in response to the first message; receive, via the wireless transceiver, a second message from the second wireless communication device, the second message comprising a second data frame, wherein ranging measurement information for the first message and the first response message is encapsulated in the second data frame; and estimate a range between the first wireless communication device and the second wireless communication device based at least in part on the ranging measurement information.

In one implementation, a first wireless communication device configured for ranging, includes means for transmitting a ranging request for a ranging procedure to a second wireless communication device; means for receiving a first message from the second wireless communication device based at least in part on the transmitted ranging request, the first message comprising a first data frame; means for transmitting a first response message to the second wireless communication device in response to the first message; means for receiving a second message from the second wireless communication device, the second message comprising a second data frame, wherein ranging measurement information for the first message and the first response message is encapsulated in the second data frame; and means for estimating a range between the first wireless communication device and the second wireless communication device based at least in part on the ranging measurement information.

In one implementation, a non-transitory storage medium including program code stored thereon, the program code is operable to configure at least one processor in a first wireless communication device configured for ranging, includes program code comprising instructions to transmit a ranging request for a ranging procedure to a second wireless communication device; receive a first message from the second wireless communication device based at least in part on the transmitted ranging request, the first message comprising a first data frame; transmit a first response message to the second wireless communication device in response to the first message; receive a second message from the second wireless communication device, the second message comprising a second data frame, wherein ranging measurement information for the first message and the first response message is encapsulated in the second data frame; and estimate a range between the first wireless communication device and the second wireless communication device based at least in part on the ranging measurement information.

In one implementation, a method performed by a first wireless communication device for ranging, includes receiving a ranging request for a ranging procedure from a second wireless communication device; transmitting a first message to the second wireless communication device based at least in part on the received ranging request, the first message comprising a first data frame; receiving a first response message from the second wireless communication device in response to the first message; and transmitting a second message to the second wireless communication device, the second message comprising a second data frame, wherein ranging measurement information for the first message and the first response message is encapsulated in the second data frame with which the second wireless communication device estimates a range between the first wireless communication device and the second wireless communication device.

In one implementation, a first wireless communication device configured for ranging, includes a wireless transceiver; at least one memory; at least one processor coupled to the wireless transceiver and the at least one memory, wherein the at least one processor is configured to: receive, via the wireless transceiver, a ranging request for a ranging procedure from a second wireless communication device; transmit, via the wireless transceiver, a first message to the second wireless communication device based at least in part on the received ranging request, the first message comprising a first data frame; receive, via the wireless transceiver, a first response message from the second wireless communication device in response to the first message; and transmit, via the wireless transceiver, a second message to the second wireless communication device, the second message comprising a second data frame, wherein ranging measurement information for the first message and the first response message is encapsulated in the second data frame with which the second wireless communication device estimates a range between the first wireless communication device and the second wireless communication device.

In one implementation, a first wireless communication device configured for ranging, includes means for receiving a ranging request for a ranging procedure from a second wireless communication device; means for transmitting a first message to the second wireless communication device based at least in part on the received ranging request, the first message comprising a first data frame; means for receiving a first response message from the second wireless communication device in response to the first message; and means for transmitting a second message to the second wireless communication device, the second message comprising a second data frame, wherein ranging measurement information for the first message and the first response message is encapsulated in the second data frame with which the second wireless communication device estimates a range between the first wireless communication device and the second wireless communication device.

In one implementation, a non-transitory storage medium including program code stored thereon, the program code is operable to configure at least one processor in a first wireless communication device configured for ranging, includes program code comprising instructions to receive a ranging request for a ranging procedure from a second wireless communication device; transmit a first message to the second wireless communication device based at least in part on the received ranging request, the first message comprising a first data frame; receive a first response message from the second wireless communication device in response to the first message; and transmit a second message to the second wireless communication device, the second message comprising a second data frame, wherein ranging measurement information for the first message and the first response message is encapsulated in the second data frame with which the second wireless communication device estimates a range between the first wireless communication device and the second wireless communication device.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
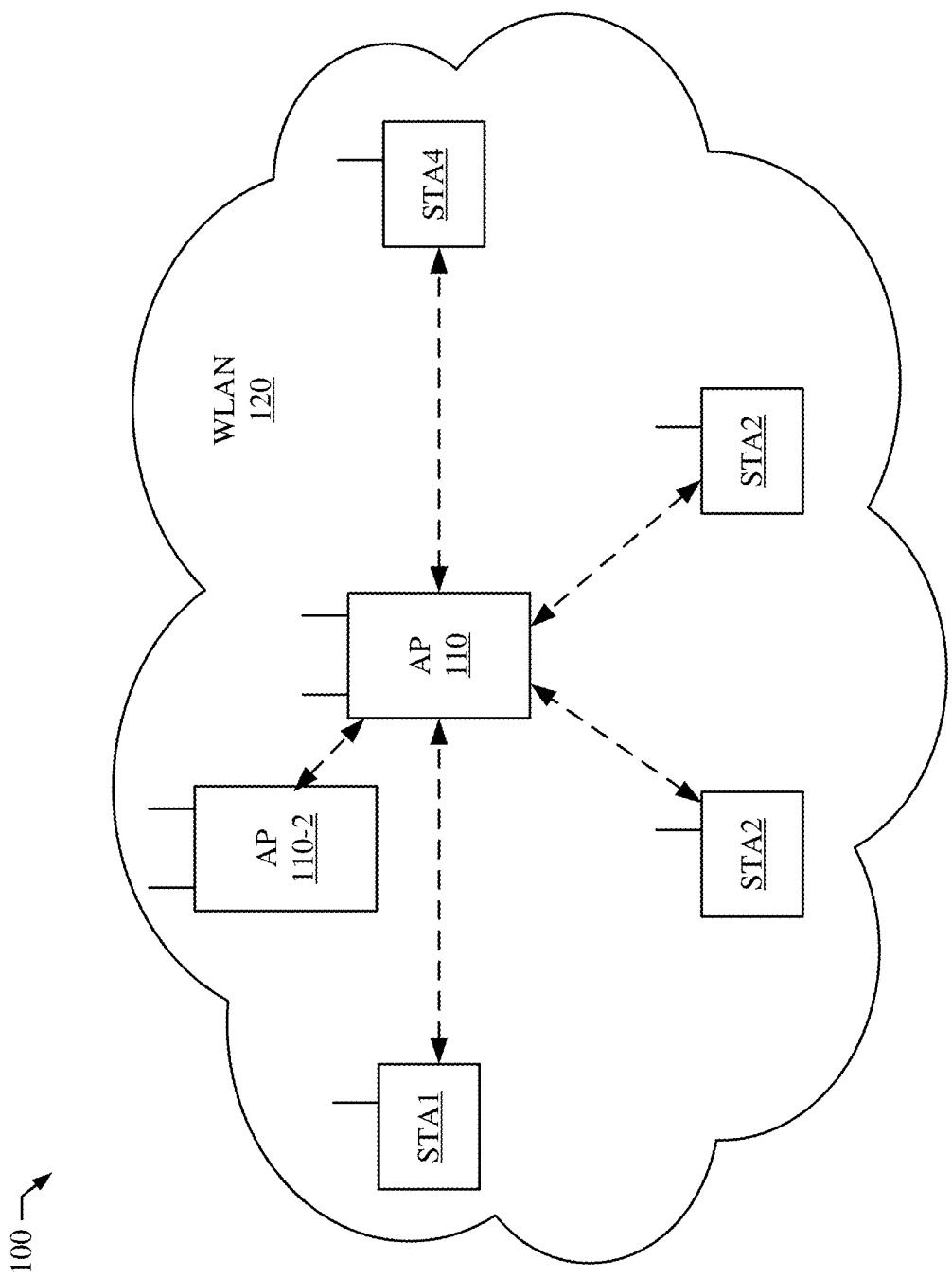
FIG. 1 is a block diagram of a WLAN system within which the example embodiments may be implemented.

The example embodiments are described below in the context of ranging operations performed by and between Wi-Fi enabled devices for simplicity only. It is to be understood that the example embodiments are equally applicable for performing ranging operations using signals of other various wireless standards or protocols, and for performing ranging operations between various devices (e.g., between a STA and a wireless AP, between APs, between STAs, and so on). Thus, although the example embodiments are described below in the context of a WLAN system, the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms WLAN and Wi-Fi may include communications governed by the IEEE 802.11 standards, Bluetooth, Hiper-LAN (a set of wireless standards, comparable to the IEEE 802.11 standards, used primarily in Europe), and other technologies having relatively short radio propagation range. Thus, the terms "WLAN" and "Wi-Fi" may be used interchangeably herein.

In addition, although described below in terms of an infrastructure WLAN system including one or more APs and a number of STAs, the example embodiments are equally applicable to other WLAN systems including, for example, multiple WLANs, Independent Basic Service Set (IBSS) systems, peer-to-peer systems (e.g., operating according to the Wi-Fi Direct protocols), and/or Hotspots. In addition, although described herein in terms of exchanging data frames between wireless devices, the example embodiments may be applied to the exchange of any data unit, packet, frame, and/or signal between wireless devices. Thus, the term "frame" may include any signal, frame, packet, or data unit such as, for example, protocol data units (PDUs), media access control (MAC) protocol data units (MPDUs), and physical layer convergence procedure protocol data units (PPDUs). The term "A-MPDU" may refer to aggregated MPDUs. As used herein, the term "time value" may refer to a difference in time between a time of departure (TOD), sometimes referred to as time of transmittal, of one frame from a given device and a time of arrival (TOA), sometimes referred to as time of receipt, of another frame at the given device.

In the following description, numerous specific details are set forth such as examples of specific components, circuits, and processes to provide a thorough understanding of this disclosure. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scopes all embodiments defined by the appended claims.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that may be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other suitable configuration.

During location determination and navigation, two wireless devices may exchange a series of ranging messages and ranging response messages with which the range or distance between the two wireless devices can be determined. Timestamps associated with the ranging messages and ranging response messages (such as signal transmission and reception timing information) may be used to calculate round trip times (RTTs), from which the distance between the two devices can be extrapolated. With additional information, such as the position of a first wireless devices, and ranges to additional wireless devices having known positions, a position of the second wireless device may be determined.

Wi-Fi ranging and localization are widely used today, e.g., for indoor location and navigation. The IEEE 802.11REVmc standard introduced Fine Timing Measurement (FTM) protocol, which is used to measure Round Trip Time (RTT) between two Wi-Fi devices for range estimation. The timestamps in the FTM protocol, however, are transmitted without encryption, which poses a severe security issue when using the FTM protocol for ranging. The lack of security is one of the main issues that prevents wide-adoption of the FTM protocol.

The FTM protocol requires transmitting dedicated ranging frames, referred to as FTM frames, in order to obtain a range estimation. For localization, ranging frames may be exchanged with multiple anchor points having known locations in order to collect enough range measurements for location estimation. Exchanging dedicated ranging frames with multiple anchor points impacts the network throughput.

Improvements to security are proposed with the proposed IEEE 802.11az standard, which is a new generation of Wi-Fi location. The improvements to security in IEEE 802.11az, however, requires additional dedicated ranging frames called Location Measurement Report (LMR) frames, which will not improve the throughput issue.

Implementations disclosed herein may improve one or both of the above-mentioned security issue as well as the throughput issue. For example, in one implementation, a ranging procedure may use regular data frames to encapsulate timestamps and token information instead of using dedicated ranging (FTM or LMR) frames, which will improve throughput. Additionally, data frames are typically encrypted, so encapsulating timestamps and token information in data frames will improve security. In one implementation, a reserved bit in the current data frame format may be used to indicate whether or not timestamps and token information are embedded in a transmitted data frame.

FIG. 1 is a block diagram of a wireless system 100 that supports ranging protocol enhancements using data frames. The wireless system 100 is shown to include four wireless stations STA1-STA4, a wireless access point (AP) 110 and a second wireless AP 110-2, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only two APs 110 and 110-2 are shown in FIG. 1 for simplicity, it is to be understood that WLAN 120 may be formed by any number of access points, e.g., one or more APs. The AP 110 is assigned a unique media access control (MAC) address that is programmed therein by, for example, the manufacturer of the access point. Similarly, each of stations STA1-STA4 is also assigned a unique MAC address. For some embodiments, the wireless system 100 may correspond to a multiple-input multiple-output (MIMO) wireless network, and may support single-user MIMO (SU-MIMO) and multi-user (MU-MIMO) communications. Further, although the WLAN 120 is depicted in FIG. 1 as an infrastructure basic service set (BSS), for other example embodiments, WLAN 120 may be an IBSS, an ad-hoc network, or a peer-to-peer (P2P) network (e.g., operating according to the Wi-Fi Direct protocols).

Each of stations STA1-STA4 may be any suitable Wi-Fi enabled wireless device including, for example, a cell phone, personal digital assistant (PDA), tablet device, laptop computer, or the like. Each of stations STA1-STA4 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each of stations STA1-STA4 may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 4A-11.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, AP 110 may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that stores instructions for performing operations described below with respect below with respect to FIGS. 4A-11.

For the stations STA1-STA4 and/or AP 110, the one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band, within a 5 GHz frequency band in accordance with the IEEE 802.11 specification, and/or within a 60 GHz frequency band. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within each of the stations STA1-STA4 may be any technically feasible transceiver such as a ZigBee transceiver described by a specification from the ZigBee specification, a WiGig transceiver, and/or a HomePlug transceiver described a specification from the HomePlug Alliance.

For at least some embodiments, each of the stations STA1-STA4 and AP 110 may include radio frequency (RF) ranging circuitry (e.g., formed using well-known software modules, hardware components, and/or a suitable combination thereof) that may be used to estimate the distance between itself and another Wi-Fi enabled device and to determine the location of itself, relative to one or more other wireless devices, using ranging techniques described herein. In addition, each of the stations STA1-STA4 and/or AP 110 may include a local memory (not shown in FIG. 1 for simplicity) to store a cache of Wi-Fi access point and/or station data.

For at least some embodiments, ranging operations described herein may be performed without using the AP 110, for example, by having a number of the stations operating in an ad-hoc or peer-to-peer mode, thereby allowing the stations to range one another even when outside the reception range of AP 110 or a visible WLAN (or other wireless network). In addition, for at least some example embodiments, ranging operations described herein may be performed between two APs that are in wireless range of each other.

Figure 2:
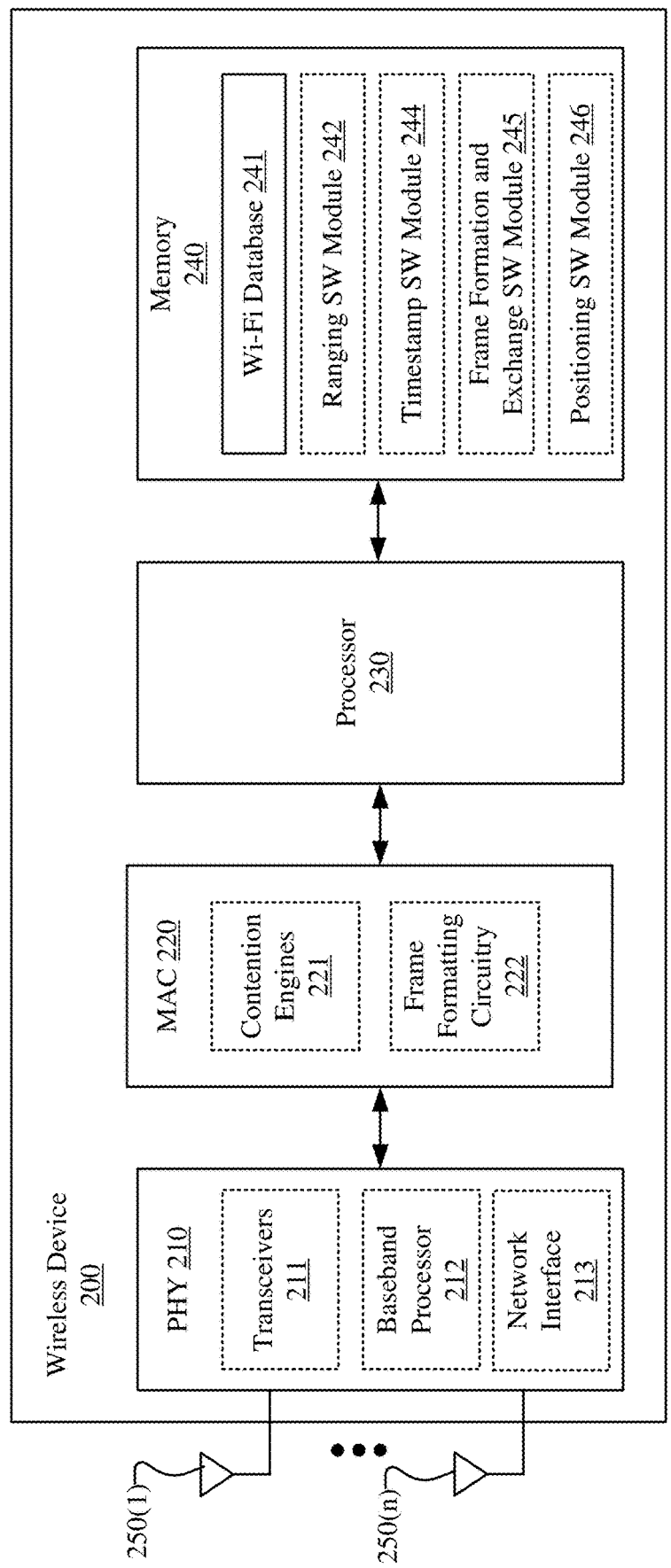
FIG. 2 is a block diagram of a wireless device in accordance with example embodiments.

FIG. 2 shows a wireless device 200 that may be one embodiment of the stations STA1-STA4 and/or AP 110 of FIG. 1. The wireless device 200 may include a PHY device 210 including at least a number of transceivers 211, a baseband processor 212, and a network interface 213, may include a MAC device 220 including at least a number of contention engines 221 and frame formatting circuitry 222, may include a processor 230, may include a memory 240, and may include a number of antennas 250(1)-250($n$). The transceivers 211 may be coupled to antennas 250(1)-250($n$), either directly or through an antenna selection circuit (not shown for simplicity). The transceivers 211 may be used to transmit signals to and receive signals from AP 110, other stations, and/or other suitable wireless devices (see also FIG. 1), and may be used to scan the surrounding environment to detect and identify nearby access points and other wireless devices (e.g., within wireless range of wireless device 200). Although not shown in FIG. 2 for simplicity, the transceivers 211 may include any number of transmit chains to process and transmit signals to other wireless devices via antennas 250(1)-250(n), and may include any number of receive chains to process signals received from antennas 250(1)-250(n). Thus, for example embodiments, the wireless device 200 may be configured for MIMO operations. The MIMO operations may include SU-MIMO operations and/or MU-MIMO operations.

The baseband processor 212 may be used to process signals received from processor 230 and/or memory 240 and to forward the processed signals to transceivers 211 for transmission via one or more of antennas 250(1)-250(n), and may be used to process signals received from one or more of antennas 250(1)-250(n) via transceivers 211 and to forward the processed signals to processor 230 and/or memory 240.

The network interface 213, which may be present if wireless device 200 is an AP, may be a wired or wireless interface capable of connecting to other APs and the network, such as a LAN, WAN, MAN, and/or the Internet.

For purposes of discussion herein, MAC device 220 is shown in FIG. 2 as being coupled between PHY device 210 and processor 230. For actual embodiments, PHY device 210, MAC device 220, processor 230, and/or memory 240 may be connected together using one or more buses (not shown for simplicity).

The contention engines 221 may contend for access to one or more shared wireless mediums, and may also store packets for transmission over the one or more shared wireless mediums. For other embodiments, the contention engines 221 may be separate from MAC device 220. For still other embodiments, the contention engines 221 may be implemented as one or more software modules (e.g., stored in memory 240 or stored in memory provided within MAC device 220) containing instructions that, when executed by processor 230, perform the functions of contention engines 221.

The frame formatting circuitry 222 may be used to create and/or format frames received from processor 230 and/or memory 240 (e.g., by adding MAC headers to PDUs provided by processor 230), and may be used to re-format frames received from PHY device 210 (e.g., by stripping MAC headers from frames received from PHY device 210).

Memory 240 includes a Wi-Fi database 241 that may store location data, configuration information, data rates, MAC addresses, and other suitable information about (or pertaining to) a number of access points, stations, and/or other wireless devices. The Wi-Fi database 241 may also store profile information for a number of wireless devices. The profile information for a given wireless device may include information including, for example, the wireless device's service set identification (SSID), channel information, received signal strength indicator (RSSI) values, goodput values, channel state information (CSI), and connection history with wireless device 200.

Memory 240 may also include a non-transitory computer-readable medium (e.g., one or more nonvolatile memory elements, such as EPROM, EEPROM, Flash memory, a hard drive, and so on) that may store instructions or program code that contain executable code or software instructions that when executed by the processor 230 causes the processor 230 to operate as a special purpose computer programmed to perform the techniques disclosed herein. As illustrated, the memory 240 may include one or more components or modules that may be implemented by the processor 230 to perform the methodologies described herein. While the components or modules are illustrated as software in memory 240 that is executable by the processor 230, it should be understood that the components or modules may be stored in a separate non-transitory computer-readable medium or may be dedicated hardware either in the processor 230 or off the processor. It should be appreciated that the organization of the contents of the memory 240 is merely exemplary, and as such the functionality of the modules and/or data structures may be combined, separated, and/or be structured in different ways depending upon the implementation of the wireless device 200. The memory 240 or other computer-readable medium may include the following software (SW) modules.

The memory 240 may include a ranging SW module 242 that when implemented by the processor 230 configures the processor 230 to determine RTT values and/or to estimate the distance between wireless device 200 and one or more other devices, for example, as described below for one or more operations of FIGS. 4A-11.

The memory 240 may include a timestamp SW module 244 that when implemented by the processor 230 configures the processor 230 to capture timestamps of signals received by wireless device 200 (e.g., TOA information) and/or to capture timestamps of signals transmitted from wireless device 200 (e.g., TOD information), for example, as described below for one or more operations of FIGS. 4A-11.

The memory 240 may include a frame formation and exchange SW module 245 that when implemented by the processor 230 configures the processor 230 to create, send, and/or receive frames or packets, including data frames or data packets and/or to embed ranging information, including TOA information, TOD information, and token information into selected frames or packets, including data frame or data packets, and in some implementations to read or set a reserved bit to indicate that ranging information is embedded in the data frame or data packet, for example, as described below for one or more operations of FIGS. 4A-11.

The memory 240 may include a positioning SW module 246 that when implemented by the processor 230 configures the processor 230 to determine the location of wireless device 200 based on the distances determined by the ranging SW module 242, for example, as described below for one or more operations of FIGS. 4A-11.

Each software module includes instructions that, when executed by processor 230, cause the wireless device 200 to perform the corresponding functions. The non-transitory computer-readable medium of memory 240 thus includes instructions for performing all or a portion of the operations of FIGS. 4A-11.

Processor 230, which is coupled to PHY device 210, MAC device 220, and memory 240, may be one or more suitable processors capable of executing scripts or instructions of one or more software programs stored in wireless device 200 (e.g., within memory 240). For example, processor 230 may execute the ranging SW module 242 to determine RTT values and/or to estimate the distance between wireless device 200 and one or more other devices. Processor 230 may execute the timestamp SW module 244 to capture timestamps of signals received by wireless device 200 (e.g., TOA information) and/or to capture timestamps of signals transmitted from wireless device 200 (e.g., TOD information). Processor 230 may execute the frame formation and exchange SW module 245 to create, send, and/or receive frames or packets and/or to embed ranging information, including TOA information, TOD information, and token information, into selected frames or packets, including data frames or data packets and in some implementation to read or set a reserved bit to indicate the presence of ranging information embedded in a data frame or data packet. Processor 230 may execute the positioning SW module 246 to determine the location of wireless device 200 based on the distances determined by the ranging SW module 242, and/or other suitable information indicative of the position of wireless device 200 relative to one or more other devices.

Figure 3:
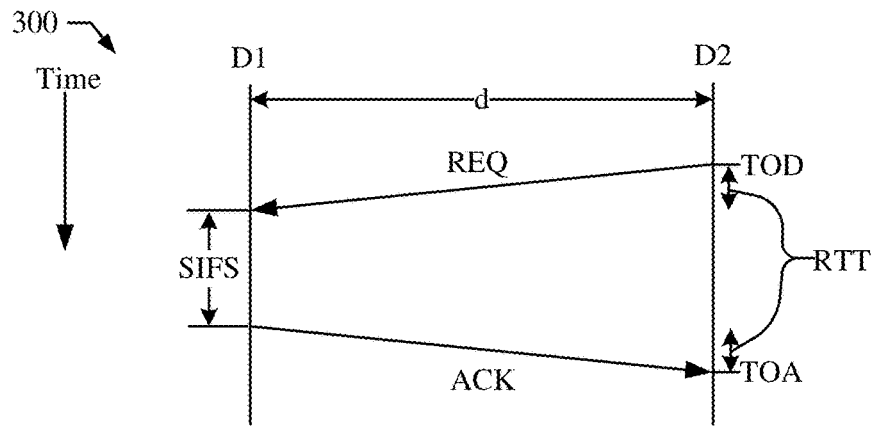
FIG. 3 shows a signal diagram of an example ranging operation.

As mentioned above, the distance between a pair of wireless devices may be determined using the RTT of signals exchanged between the wireless devices. For example, FIG. 3 shows a signal diagram of an example ranging operation 300 between a first device D1 and a second device D2. The distance (d) between the first device D1 and the second device D2 may be estimated as d=c*RTT/2, where c is the speed of light, and RTT is the summation of the actual signal propagation times of a request (REQ) frame and an acknowledgement (ACK) frame exchanged between device D1 and device D2. Device D1 and device D2 may each be, for example, an access point (e.g., AP 110 of FIG. 1), a station (e.g., one of stations STA1-STA4 of FIG. 1), or another suitable wireless device (e.g., wireless device 200 of FIG. 2).

More specifically, device D2 may estimate the RTT between itself and device D1 using the time of departure (TOD) of the REQ frame transmitted from device D2, the time of arrival (TOA) of the ACK frame received by device D2, and the short interframe space (SIFS) duration of device D1. The SIFS duration indicates the duration of time between device D1 receiving the REQ frame and transmitting the ACK frame. The SIFS duration, a range of values for which are provided by the IEEE 802.11 standards, provides Wi-Fi enabled devices time to switch their transceivers from a receive mode (e.g., to receive the REQ frame) to a transmit mode (e.g., to transmit the ACK frame).

Because different make-and-models (and sometimes even same make-and-models) of communication devices have different processing delays, the precise value of SIFS may vary between devices (and even between successive frame receptions/transmissions in the same device). As a result, the value of SIFS is typically estimated, which often leads to errors in estimating the distance between two devices. More specifically, the IEEE 802.11 standards define the SIFS duration as 10 us+/−900 ns at 2.4 GHz, 16 us+/−900 ns at 5 GHz, and 3 us+/−900 ns at 60 GHz. These "standard" SIFS durations include tolerances that may decrease the accuracy of RTT estimates. For example, even if the SIFS duration of device D1 may be estimated within +/−25 ns, a ranging error of +/−7.5 meters may result (which may be unacceptable for many positioning systems).

To reduce ranging errors resulting from uncertainties in the value of SIFS, revisions to the IEEE 802.11 standards call for each ranging device to capture timestamps of incoming and outgoing frames so that the value of RTT may be determined without using SIFS.

Figure 4A:
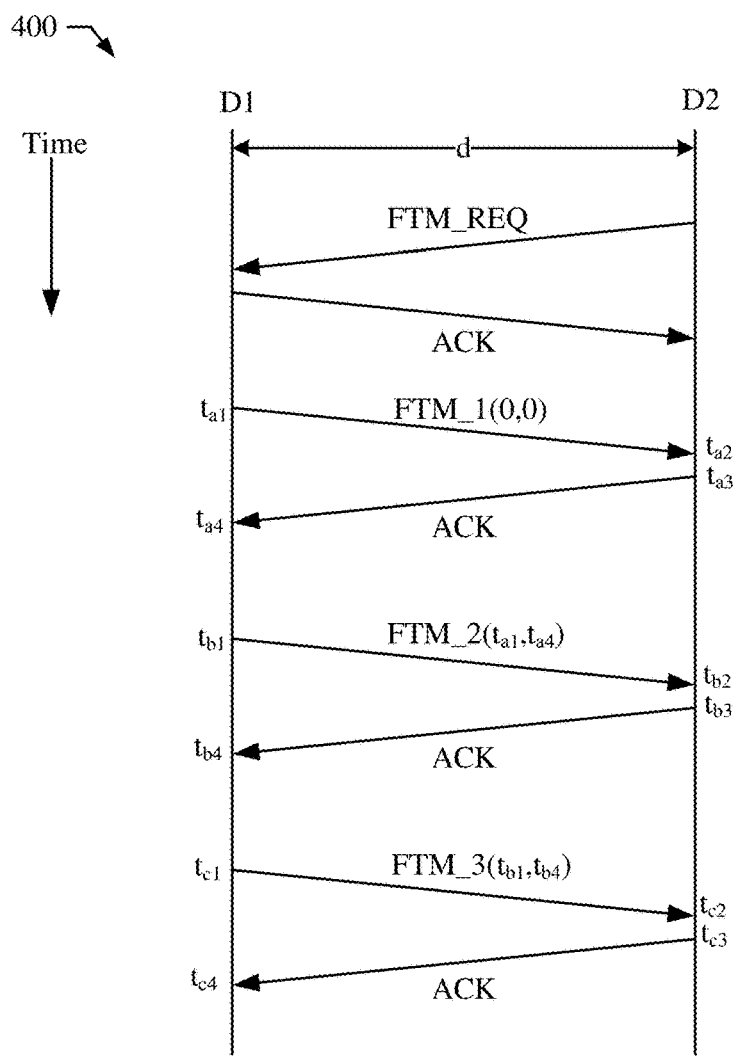
FIG. 4A shows a signal diagram of another example ranging operation using Fine Timing Measurement (FTM) frames.

FIG. 4A, for example, shows a signal diagram of an example ranging operation 400 between device D1 and device D2 performed using Fine Timing Measurement (FTM) frames in accordance with the IEEE 802.11 REVmc standards. Device D1 and device D2 may each be, for example, an access point (e.g., AP 110 of FIG. 1), a station (e.g., one of stations STA1-STA4 of FIG. 1), or other suitable wireless device (e.g., wireless device 200 of FIG. 2). For the example of FIG. 4A, device D2 requests the ranging operation; thus, device D2 is the initiator device (or alternatively the requestor device) and device D1 is the responder device. Note that the term "initiator device" may also refer to an initiator STA, and the term "responder device" may also refer to a responder STA.

Device D2 may request or initiate the ranging operation by transmitting an FTM request (FTM_REQ) frame to device D1. The FTM_REQ frame may also include a request for device D1 to capture timestamps (e.g., TOA information) of frames received by device D1 and to capture timestamps (e.g., TOD information) of frames transmitted from device D1. Device D1 receives the FTM_REQ frame, and may acknowledge the requested ranging operation by transmitting an acknowledgement (ACK) frame to device D2. The ACK frame may indicate whether device D1 is capable of capturing the requested timestamps. It is noted that the exchange of the FTM_REQ frame and the ACK frame is a handshake process that not only signals an intent to perform a ranging operation but also allows devices D1 and D2 to determine whether each other supports capturing timestamps.

At time $t_{a1}$, device D1 transmits a first FTM (FTM_1) frame to device D2, and may capture the TOD of the FTM_1 frame as time $t_{a1}$. Device D2 receives the FTM_1 frame at time $t_{a2}$, and may capture the TOA of the FTM_1 frame as time $t_{a2}$. Device D2 responds by transmitting an ACK frame to device D1 at time $t_{a3}$, and may capture the TOD of the ACK frame as time $t_{a3}$. Device D1 receives the ACK frame at time $t_{a4}$, and may capture the TOA of the ACK frame at time $t_{a4}$. At time $t_{b1}$, device D1 transmits to device D2 a second FTM (FTM_2) frame that includes the timestamps captured at times $t_{a1}$ and $t_{a4}$ (e.g., the TOD of the FTM_1 frame and the TOA of the ACK frame). Device D2 receives the FTM_2 frame at time $t_{b2}$, and may capture its timestamp as time $t_{b2}$. Device D2 transmits an ACK frame to device D1 at time $t_{b3}$. Device D1 receives the ACK frame at time $t_{b4}$. This process may continue for any number of subsequent FTM and ACK frame exchanges between devices D1 and D2, for example, where device D1 embeds the timestamps of a given FTM and ACK frame exchange into a subsequent FTM frame transmitted to device D2.

Upon receiving the FTM_2 frame at time $t_{b2}$, device D2 has timestamp values for times $t_{a1}$, $t_{a2}$, $t_{a3}$, and $t_{a4}$ that correspond to the TOD of the FTM_1 frame transmitted from device D1, the TOA of the FTM_1 frame at device D2, the TOD of the ACK frame transmitted from device D2, and the TOA of the ACK frame at device D1, respectively. Thereafter, device D2 may determine RTT as $(t_{a4}-t_{a1})+(t_{a2}-t_{a1})$. Because the RTT estimate does not involve estimating SIFS for either device D1 or device D2, the RTT estimate does not involve errors resulting from uncertainties of SIFS durations. Consequently, the accuracy of the resulting estimate of the distance between devices D1 and D2 is improved (e.g., as compared to the ranging operation 300 of FIG. 3). A device may perform this ranging operation with at least three other devices having known locations, and use known trilateration techniques to estimate its location.

Note that the example ranging operation 400 may continue. For example, device D2 may transmit an ACK frame to device D1 at time $t_{b3}$ (e.g., to acknowledge reception of the FTM_2 frame). Device D1 receives the ACK frame at time $t_{b4}$, and may record the TOA of the ACK frame as time $t_{b4}$. Device D1 may embed another time value in an FTM_3 frame, and then transmit the FTM_3 frame to device D2 at time $t_{c1}$. The time value embedded in the FTM_3 frame may indicate a difference time value equal to $t_{b4}-t_{b1}$.

While RTT techniques may be used to determine a given device's location relative to another device, the given device may need to perform ranging operations with three other devices to determine its actual position. More specifically, performing ranging operation 400 with three other devices may involve three separate exchanges of FTM frames (with the three other devices), which not only consumes valuable time but also consumes limited bandwidth of a shared wireless medium.

Figure 4B:
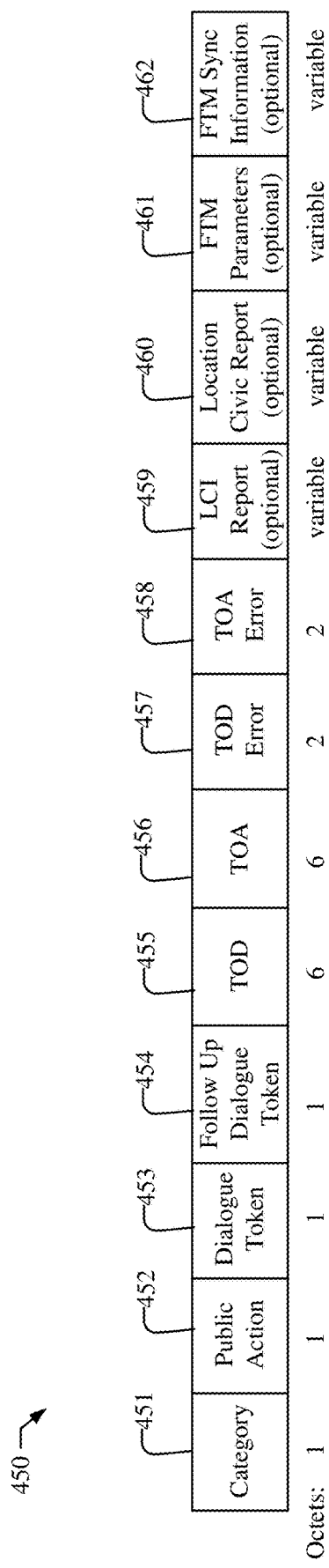
FIG. 4B shows an example of a FTM frame.

FIG. 4B depicts an example of an FTM frame 450. The FTM frame 450 may include a category field 451, a public action field 452, a dialog token field 453, a follow up dialog token field 454, a TOD field 455, a TOA field 456, a TOD error field 457, a TOA error field 458, an optional LCI report field 459, an optional location civic report field 460, an optional FTM parameters field 461, and an optional FTM synchronization information field 462. For at least one embodiment, the TOD field 455 and the TOA field 456 may be 6 bytes each, and the dialog token field 453 and follow up dialog token field 454 may be 1 byte each. In some aspects, the responder device may embed TOA information of the received ACK frame into the TOA field 456 of FTM frame 450, and may embed TOD information of the FTM_1 frame into the TOD field 455 of FTM frame 450.

As discussed above, the transmitted FTM frames are not encrypted. The lack of security with FTM has prevented wide adoption of the FTM protocol. The Wi-Fi location standard continues to develop, e.g., in IEEE 802.11az, which improves security.

Figure 5:
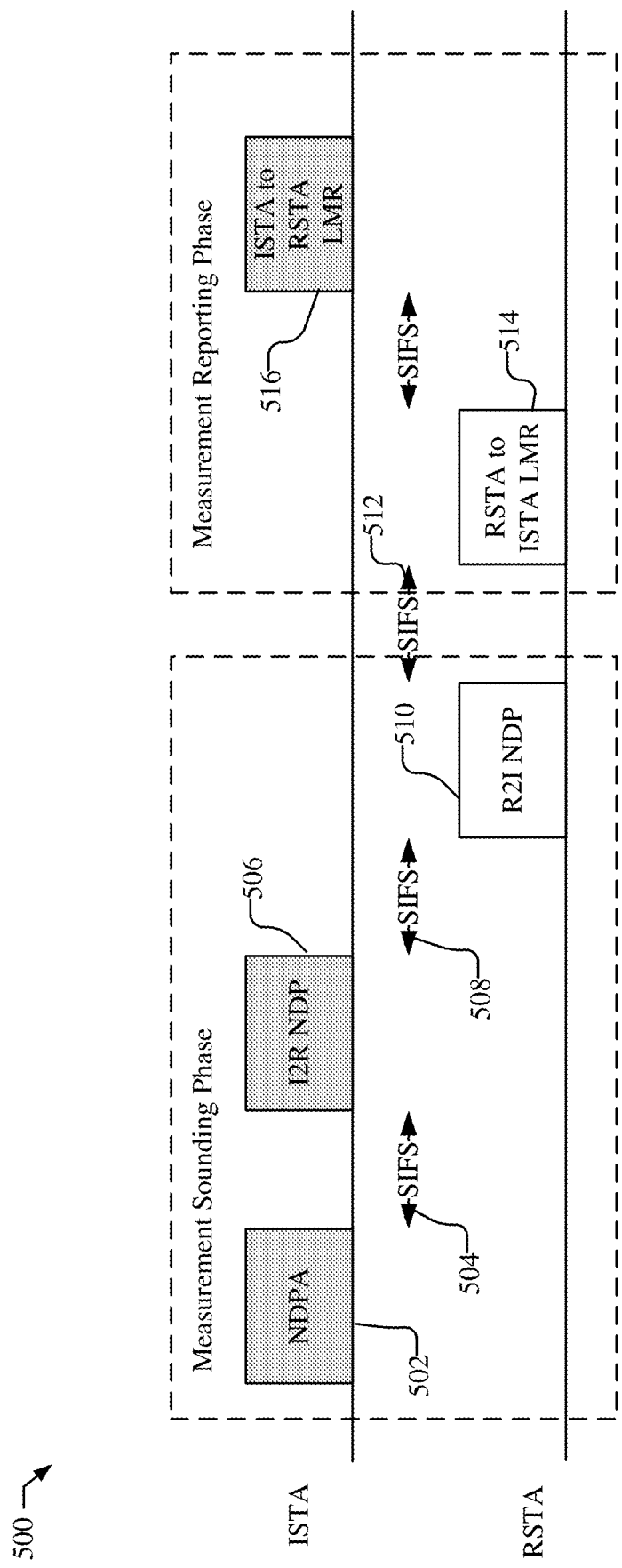
FIG. 5 shows a signal diagram of another example ranging operation using a non-trigger based sequence of Null Data Packet (NDP) sounding frames and Location Measurement Report (LMR) frames.

FIG. 5 is a diagram of an example of a ranging procedure 500 utilizing a non-trigger based sequence of null data packet (NDP) soundings in accordance with current IEEE 802.11az standards. The ranging procedure 500 illustrates frame transmissions for both an initiator device (ISTA) and a responder device (RSTA). During a measurement sounding phase, the initiator device (ISTA) may issue a ranging NDP announcement frame (NDPA) 502 to a responder device (RSTA). The NDPA frame 502 signals to the responder that ranging measurements are going to be performed using further NDP frames.

In particular, after a short interframe space (SIFS) time 504, which is normally the amount of time that is required for a wireless device to process a received frame and to respond with a response frame, an initiator to responder (I2R) NDP frame 506 (known also as an uplink (UL) NDP frame) is transmitted by the initiator device ISTA to the responder device RSTA. In response to receiving I2R NDP frame 506 and after another SIFS time period 508, the responder RSTA transmits a responder NDP frame 510 (known also as a downlink (DL) NDP frame) to the initiator device ISTA.

NDP frame 506 and responder NDP frame 510 may be utilized for measurement of the RTT, for example, and calculation of the RTT, as well as RTT quality, may be effectuated. As may be seen in FIG. 5, after the measurement sounding phase, e.g., after SIFS time period 512, the processes of measurement calculation and measurement reporting are performed in the measurement reporting phase. In reporting the measurements, such as timing measurement involved in determining RTT, a location measurement report (LMR) as shown by LMR frame 514 may be transmitted from the responder RSTA to the initiator ISTA according to the proposed IEEE 802.11az standard, for example. The LMR frame 514 may be encrypted. Furthermore, the initiator device ISTA may be configured to determine both the RTT and an RTT quality. In an aspect, the ranging procedure 500 may include a feedback frame, illustrated as LMR frame 516, that is transmitted from the initiator device (ISTA) to responder device (RSTA) to report the measured RTT and RTT quality to the responder device RSTA. The LMR frame 516 may be encrypted. This feedback frame may be configured as an LMR and thus may be referred to as LMR frame 516, or may be configured as a modified LMR to include the RTT and RTT quality information, or transmitted in conjunction with the LMR; i.e., either prior to, concurrent with, or subsequent to the timing of the LMR frame 516.

Of further note, the example of FIG. 5 is shown in the context of a non-trigger based (TB) ranging sequence according to proposals under the IEEE 802.11az standard. Those skilled in the art will appreciate that the presently disclosed concepts may also be applied to a TB ranging sequence, such as a sequence where an access point (AP) triggers measurement sounding for two or more wireless devices or stations (STAs). In such case, feedback frames similar to LMR frame 516 may be transmitted from the STAs to the AP to report the measured RTT and RTT quality.

Figure 6:
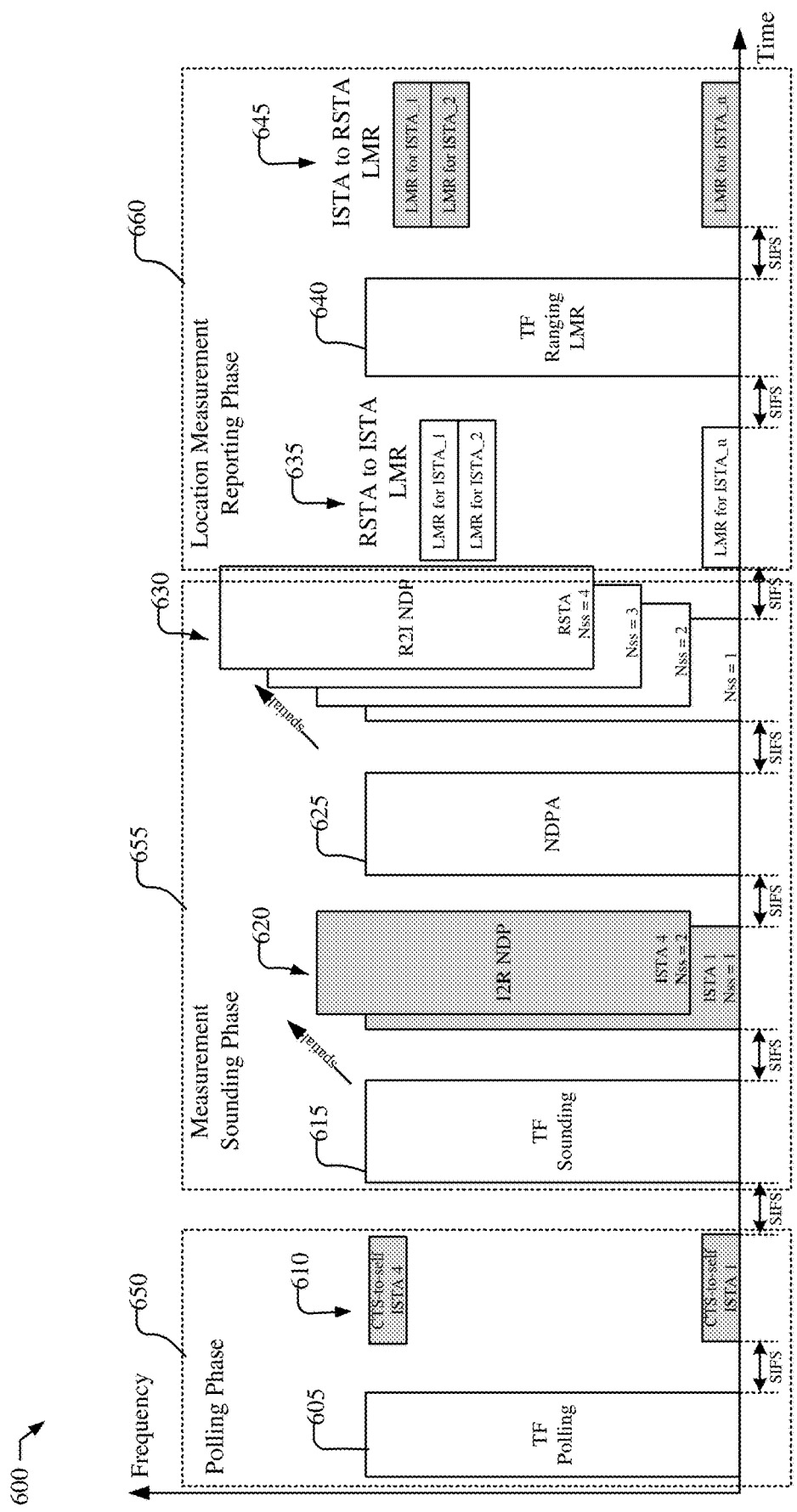
FIG. 6 shows a signal diagram of another example ranging operation using a trigger based sequence of NDP sounding frames without physical layer (PHY) security.

FIG. 6 is a diagram of an example of another NDP ranging procedure 600 that uses a trigger based sequence of NDP soundings without physical layer (PHY) security in accordance with IEEE 802.11az standards. In this example, it is assumed that number of an initiator devices (ISTA), indicated as an "n" number, triggers sounding and measurement reporting of a responder devices (RSTA). In the NDP ranging procedure 600, dedicated ranging frames are used and the location measurement reports (LMR) are encrypted. As shown, the diagram illustrates frame transmissions over time verses frequency usage for the various frames. The NDP ranging procedure 600 may include a polling phase 650, followed by a range measurement sounding phase 655, followed by a location measurement reporting phase 660.

During the polling phase 650, a responding device may transmit a poll trigger frame (TF) 605 or request to stations or wireless devices to participate in sounding measurements in the particular timeframe. In response to the poll TF 605, the initiating devices may transmit ranging poll response (PR) messages 610 in clear to send (CTS)-to-self messages.

The range measurement sounding phase 655 may commence, for example, SIFS time after the polling phase 650. The range measurement sounding phase 655 may include a sounding trigger frame (TF) 615, that may allocate uplink resources to one or more initiating devices. The sounding TF 615 may be followed by one or more I2R NDP soundings from each of the initiating devices to the responding device. The I2R NDP soundings 620 from the initiating devices may be spatially multiplexed, as illustrated. As illustrated in FIG. 6, by way of example, range measurement sounding phase 655 illustrates two initiating devices (ISTA1 and ISTA 4) transmitting I2R NDP soundings 620 in the trigger based sequence with ISTA1 sending Nss (stream)=1 and ISTA sending Nss (stream)=2. After the uplink NDP sounding 620, the responding device may transmit an NDPA frame 625 which is received by each initiating device and is followed by a DL responder to initiator (R2I) NDP sounding frame 630 to each of the initiating devices, which may be spatially multiplexed. For example, the responding device (RSTA) may have four antennas and may send four streams of R2I NDP to the initiating devices, e.g., on Nss (stream)=1, 2, 3, 4, as illustrated.

Throughout the range measurement sounding phase 655, stations may perform time of flight (ToF) measurements. For example, the responding device and initiating devices may capture timestamps of sounding frames exchanged during the range measurement sounding phase 655. The initiating devices may capture the time at which their respective UL I2R NDPs 620 are transmitted (t1), the responding device may capture the time at which the UL I2R NDPs 620 arrive or are received (t2), the responding device may capture the time at which the DL R2I NDP(s) 630 are transmitted (t3), and the initiating devices may capture the time at which the DL R2I NDP(s) 630 are received (t4). The timestamp values associated with t2 and t3 may be associated with measurements performed according to the responding device clock (such as the timing information from the responding device perspective without applying any frequency offset correction to the time basis).

The location measurement reporting phase 660 may follow the range measurement sounding phase 655 (such as, for example, a SIFS time after the DL R2I NDP 630). In the location measurement reporting phase 660, the location measurement reports are encrypted. The measurement results (such as t1, t2, t3, and t4, as discussed herein) may be carried in a separate LMR frame 635 from responding station RSTA to each initiating stations ISTA 1 through n. For example, the LMR frames 635 may carry fields or information similar to the LMR frame 514 as described in FIG. 5. That is, the LMR frames 635 may carry information such as measurement results t1, t2, t3, and t4 (such as carrying measurement results information in a TOA field, a TOD field, or both, a TOD error field, a TOA error field, or both). Information such as measurement results, conveyed in a range measurement sounding phase 655 may be either from a current availability window or a previous availability window. That is, in some implementations, measurement results associated with a sounding frame exchange may be associated with a previous sounding message exchange. In some implementations, the trigger frame or NDPA of the preceding location sounding phase may indicate if associated measurement results are included in the same availability window or the successive availability window that may include medium allocation for sounding to the ISTAs. The responding device may assign uplink resources using a location sub-type ranging LMR trigger frame 640 and the initiating devices ISTA 1-n may provide LMR frames 645 to the responding device RSTA. RTT may be determined by the equation RTT=[(t4−t1)−(t3'−t2')], where t3' and t2' are the times at which the DL NDP sounding frame 630 was transmitted by the responding device and the time at which the UL NDP was received by the responding device, respectively, as determined by the initiating devices.

Figure 7A:
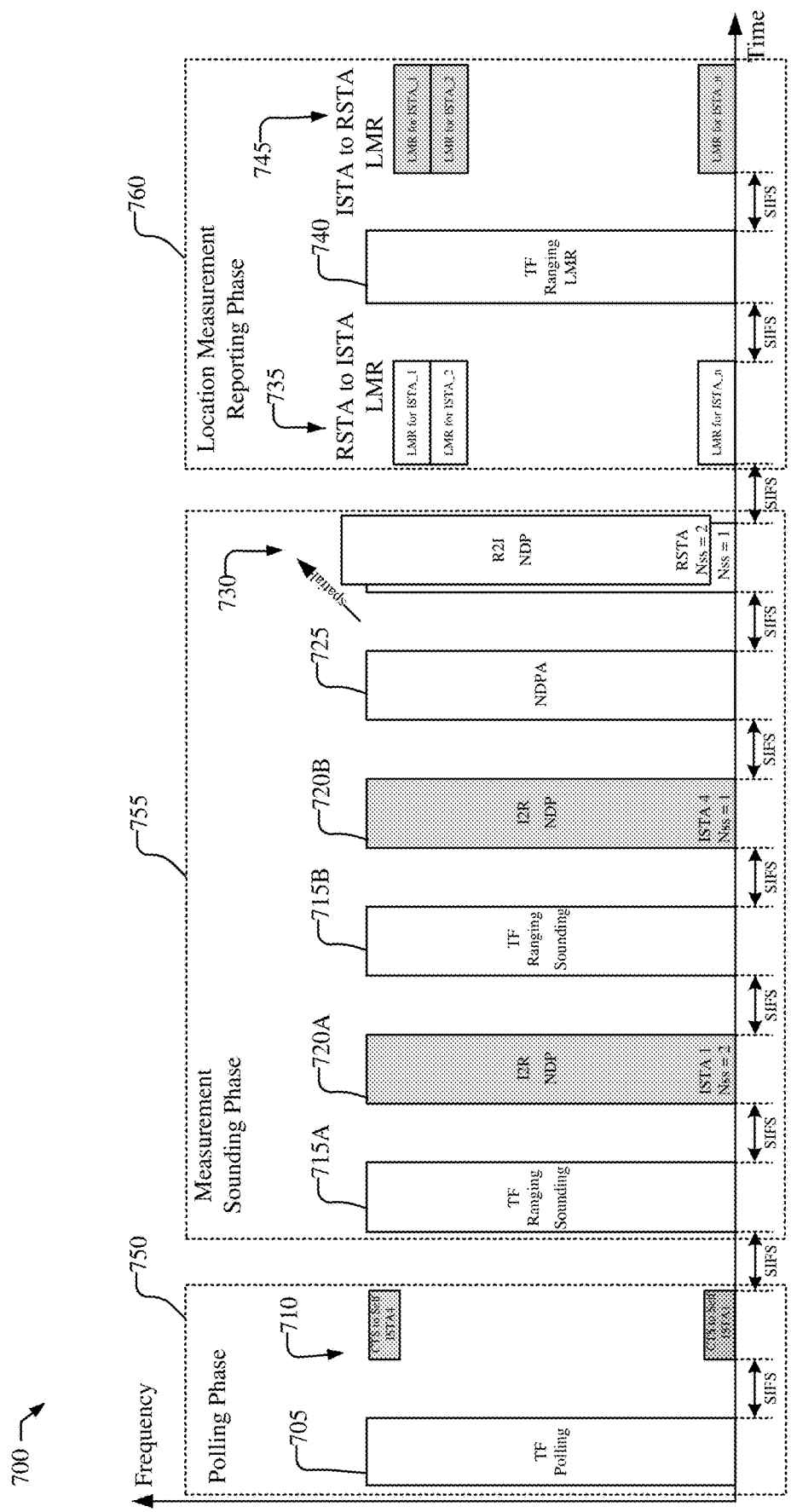
FIG. 7A shows a signal diagram of another example ranging operation using a trigger based sequence of NDP sounding frames with PHY security.

FIG. 7A is a diagram of an example of another NDP ranging procedure 700 that uses a trigger based sequence of NDP soundings with PHY security in accordance with IEEE 802.11az standards. In this example, it is assumed that number of an initiator devices (ISTA), indicated as an "n" number, triggers sounding and measurement reporting of a responder devices (RSTA). In the NDP ranging procedure 700, dedicated ranging frames are used and the location measurement reports (LMR) are encrypted. As shown, the diagram illustrates frame transmissions over time verses frequency usage for the various frames. The NDP ranging procedure 700 may include a polling phase 750, followed by a range measurement sounding phase 755, followed by a location measurement reporting phase 760.

Similar to the polling phase 650 discussed in FIG. 6, during the polling phase 750 of the NDP ranging procedure 700, a responding device may transmit a poll trigger frame (TF) 705 or request to stations or wireless devices to participate in sounding measurements in the particular timeframe. In response to the poll TF 705, the initiating devices may transmit ranging poll response (PR) messages 710 in clear to send (CTS)-to-self messages.

The range measurement sounding phase 755 may commence, for example, SIFS time after the polling phase 750. Unlike the range measurement sounding phase 655 in FIG. 6, where a single sounding trigger frame 615 was used to trigger the I2R NDP sounding frames 620 from all initiating devices IS TA, the range measurement sounding phase 755 triggers I2R NDP sounding frames from each initiating device ISTA separately. Thus, as illustrated, the range measurement sounding phase 755 may include a first sounding trigger frame 715A that may allocate uplink resources to a first initiating device ISTA1. The first sounding TF 715A may be followed by an I2R NDP sounding frame 720A from the first initiating device ISTA1 to the responding device. As illustrated, after a SIFS time, the responding device RSTA may transmit a second sounding trigger frame 715B that allocates uplink resources for a second initiating device ISTA2. The second sounding TF 715B may be followed by an I2R NDP sounding frame 720B from the second initiating device ISTA2 to the responding device. This process may be repeated for each initiating device ISTA 1-n. After the final uplink NDP sounding 720B, the responding device may transmit an NDPA frame 725 which is received by the initiating devices and is followed by a DL responder to initiator (R2I) NDP sounding frame 730 to each of the initiating devices, which may be spatially multiplexed, as illustrated.

Similar to the range measurement sounding phase 655 in FIG. 6, throughout the range measurement sounding phase 755, stations may perform time of flight (ToF) measurements. For example, the responding device and initiating devices may capture timestamps of sounding frames exchanged during the range measurement sounding phase 755. The initiating devices may capture the time at which their respective UL I2R NDPs 720A 720B are transmitted (t1), the responding device may capture the time at which the UL I2R NDPs 720A and 720B arrive or are received (t2), the responding device may capture the time at which the DL R2I NDP sounding frame(s) 730 are transmitted (t3), and the initiating devices may capture the time at which the DL R2I NDP sounding frame(s) 730 are received (t4). The timestamp values associated with t2 and t3 may be associated with measurements performed according to the responding device clock (such as the timing information from the responding device perspective without applying any frequency offset correction to the time basis).

The location measurement reporting phase 760, which may follow the range measurement sounding phase 755 (such as, for example, a SIFS time after the DL R2I NDP sounding frame 730) may be similar to the location measurement reporting phase 660 discussed in FIG. 6. In the location measurement reporting phase 760, the location measurement reports are encrypted. The measurement results (such as t1, t2, t3, and t4, as discussed herein) may be carried in a separate LMR frame 735 from responding station RSTA to each initiating stations ISTA1 through n. For example, the LMR frames 735 may carry fields or information similar to the LMR frame 514 as described in FIG. 5. That is, the LMR frames 735 may carry information such as measurement results t1, t2, t3, and t4 (such as carrying measurement results information in a TOA field, a TOD field, or both, a TOD error field, a TOA error field, or both). Information such as measurement results, conveyed in a range measurement sounding phase 755 may be either from a current availability window or a previous availability window. That is, in some implementations, measurement results associated with a sounding frame exchange may be associated with a previous sounding message exchange. In some implementations, the trigger frame or NDPA of the preceding location sounding phase may indicate if associated measurement results are included in the same availability window or the successive availability window that may include medium allocation for sounding to the ISTAs. The responding device may assign uplink resources using a location sub-type ranging LMR trigger frame 740 and the initiating devices ISTA 1-n may provide LMR frames 745 to the responding device RST. RTT may be determined by the equation RTT=[(t4−t1)−(t3'−t2')], where t3' and t2' are the times at which the DL NDP sounding frame 730 was transmitted by the responding device and the time at which the UL NDP was received by the responding device, respectively, as determined by the initiating devices.

Figure 7B:
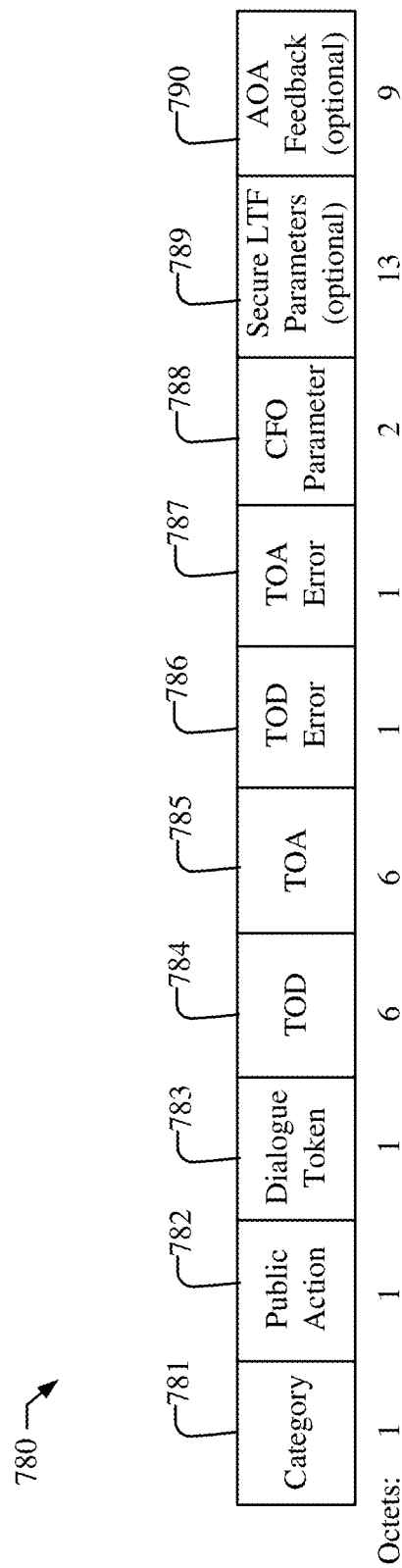
FIG. 7B depicts an example of an LMR frame.

FIG. 7B depicts an example of an LMR frame 780. The LMR frame 780 may include a category field 781, a public action field 782, a dialog token field 783, a TOD field 784, a TOA field 785, a TOD error field 786, a TOA error field 787, a carrier frequency offset (CFO) parameter field 788, an optional secure long-training field (LTF) parameters field 789, and an optional AOA feedback field 790. The TOD field 784 and the TOA field 785 may be 6 bytes each, and the dialog token field 783 may be 1 byte.

Thus, as can be seen, widely used Wi-Fi ranging and localization are not fully encrypted, which poses security problems. While improvements to security are proposed, e.g., with the IEEE 802.11az standard, additional ranging frames are required to improve security, which negatively impact throughput. Moreover, with PHY security improvements, such as illustrated in FIG. 7A, the use of individual trigger frames and sounding frames for each anchor point further compounds the negative effect on throughput.

Accordingly, in one implementation, a ranging procedure may use regular data frames to encapsulate ranging measurement information, such as timestamps and token information, instead of using dedicated ranging FTM or NDP frames. Data frames are typically encrypted, and thus, the ranging measurement information may be transmitted with improved security. Moreover, by repurposing data frames being used for data communications between the stations for a ranging procedure and to encapsulate the ranging measurement information, throughput for the ranging procedure is improved.

Figure 8A:
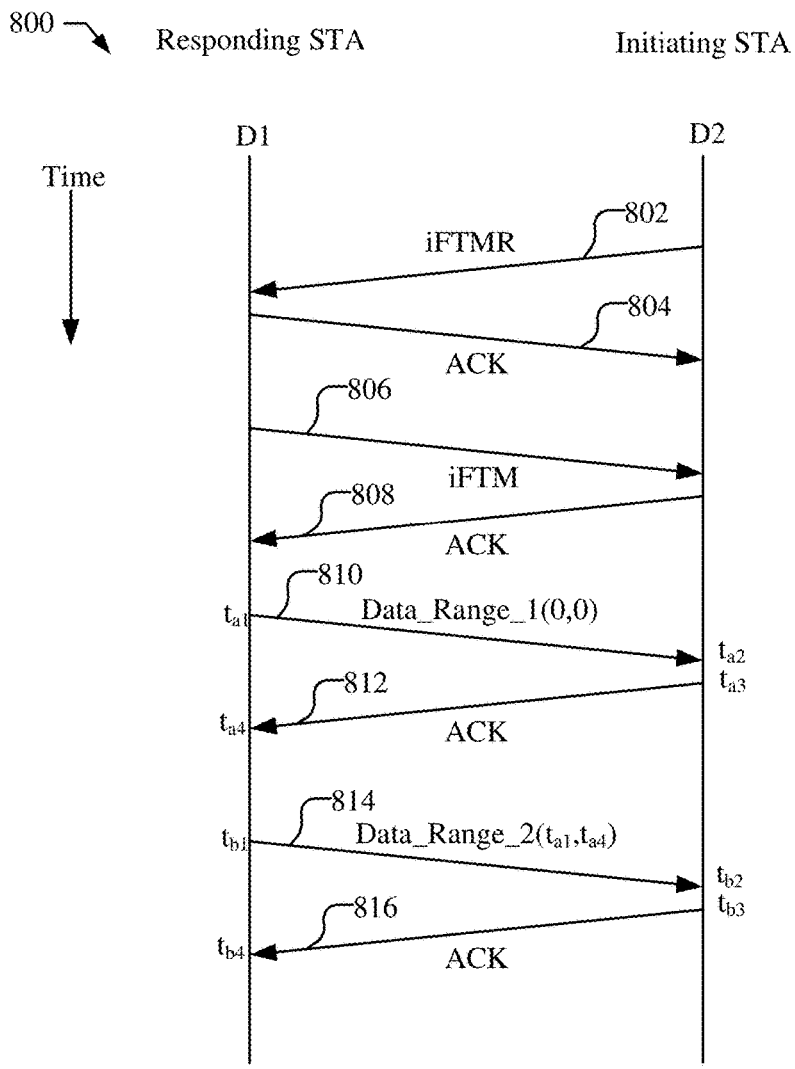
FIG. 8A shows a signal diagram of a ranging operation using data frames.

FIG. 8A shows a signal diagram of a ranging operation 800 between device D1 and device D2 performed using data frames. Device D1 and device D2 may each be, for example, an access point (e.g., AP 110 of FIG. 1), a station (e.g., one of stations STA1-STA4 of FIG. 1), or other suitable wireless device (e.g., wireless device 200 of FIG. 2). For the example of FIG. 8A, device D2 requests the ranging operation; thus, device D2 is the initiator device (or alternatively the requestor device) and device D1 is the responder device. Note that the term "initiator device" may also refer to an initiator STA, and the term "responder device" may also refer to a responder STA.

Device D2 may request or initiate the ranging operation by transmitting a ranging request 802, such as an initial fine timing measurement request (iFTMR) frame to device D1, in which the capabilities of device D2 may be provided. The iFTMR frame may include a request for device D1 to capture timestamps (e.g., TOA information) of frames received by device D1 and to capture timestamps (e.g., TOD information) of frames transmitted from device D1. The iFTMR frame may further include a request for device D1 to transmit ranging message including timestamps and token information in a data frame, as opposed to an FTM or LMR frame. Device D1 receives the iFTMR frame, and may acknowledge receipt by transmitting an acknowledgement (ACK) frame 804 to device D2. Device D1 may send an initial fine timing measurement (IFTM) frame 806 to device D2, e.g., accepting the request for the ranging operation and providing the capabilities of device D1, such as the capability of capturing the requested timestamps. The iFTM frame may indicate that device D1 will transmit ranging messages including timestamps and token information in data frames, as opposed to an FTM or LMR frame. Device D2 receives the iFTM frame, and may acknowledge receipt by transmitting an acknowledgement (ACK) frame 808 to device DE While iFTMR and iFTM are illustrated in FIG. 8A, other frames may be used to for a ranging request and to exchange capabilities and to indicate support for the use of data frames, such as a Probe Request and Probe Response.

As illustrated, in response to the ranging request, device D1 transmits a data frame 810 (Data_Range_1) to device D2, and may capture the TOD of the Data_Range_1 frame as time $t_{a1}$. The data frame Data_Range_1 is not an FTM or NDP frame, but is a data frame used for ranging. Device D2 receives the Data_Range_1 frame at time $t_{a2}$ and may capture the TOA of the Data_Range_1 frame as time $t_{a2}$. Device D2 responds by transmitting an ACK frame 812 to device D1 at time $t_{a3}$, and may capture the TOD of the ACK frame as time $t_{a3}$. Device D1 receives the ACK frame at time $t_{a4}$, and may capture the TOA of the ACK frame at time $t_{a4}$. At time $t_{b1}$, device D1 transmits to device D2 a second data frame 814 (Data_Range_2). The ranging measurement information, e.g., timestamps and token information (Dialog Token and Follow-Up Dialog Token) related to the previous data frame (Data_Range_1) transmission and acknowledgment (ACK) receipt is included in the data frame (Data_Range_2). For example, the timestamps captured at times Li and $t_{a4}$ (e.g., the TOD of the Data_Range_1 frame and the TOA of the ACK frame) as well as token information are encapsulated in the data frame (Data_Range_2). The definition and format of the timestamps and the tokens may be same as in, e.g., FTM protocol, but rather than embedding the information in an FTM frame, the information is embedded in a data frame. Data frames are typically encrypted, and accordingly, the ranging measurement information encapsulated in Data_Range_2 may be encrypted. Device D2 receives the Data_Range_2 frame at time $t_{b2}$, and may capture its timestamp as time $t_{b2}$. Device D2 transmits an ACK frame 816 to device D1 at time $t_{b3}$. Device D1 receives the ACK frame at time $t_{b4}$.

Upon receiving the Data_Range_2 frame at time $t_{b2}$, device D2 has timestamp values for times $t_{a1}$, $t_{a2}$, $t_{a3}$, and $t_{a4}$ that correspond to the TOD of the Data_Range_1 frame 810 transmitted from device D1, the TOA of the Data_Range_1 frame 810 at device D2, the TOD of the ACK frame 812 transmitted from device D2, and the TOA of the ACK frame 812 at device D1, respectively. Thereafter, device D2 may determine RTT as $(t_{a4}-t_{a1})+(t_{a2}-t_{a1})$.

The process of exchanging Data_Range frames and ACK frames may continue for any number of subsequent data frames and ACK frame exchanges between devices D1 and D2, for example, where device D1 embeds the timestamps of a given Data_Range_N and ACK frame exchange into a subsequent Data_Range_N+1 frame transmitted to device D2. An estimate of the range between the device D1 and device D2 may be based on the RTT for all of the ranging measurement exchanges.

Figure 8B:
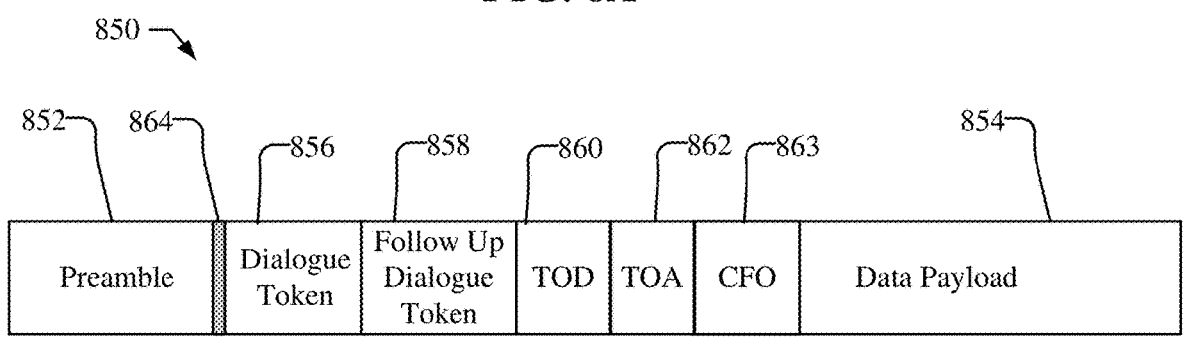
FIG. 8B shows an example of a data frame that may be used in a ranging operation.

FIG. 8B depicts an example of a Data_Range_N frame 850. The Data_Range_N frame 850 may be similar to a conventional data frame, including a preamble 852, and a data payload 854 that embeds the ranging measurement information. For example, Data_Range_N frame 850 may further include at least a dialog token field 856, a follow up dialog token field 858, a TOD field 860, and a TOA field 862, which may be part of the data payload 854. The TOD field 860 and TOA field 862, for example, may be 6 bytes each, and the token and follow up token are both 1 byte long. In some implementations, the data payload 854 may further include additional fields, such as a carrier frequency offset (CFO) Parameter field 863, which provides a clock offset between D1 and D2 and is used to assist in correcting timing error in the timestamps caused by clock offset, as in IEEE 802.11az LMR. Additionally, the Data_Range_N frame 850 may further include one bit 864 that is in the preamble 852 may be used to indicate that the current data frame carries timestamps and token information. The bit 864, for example, may be a currently reserved bit that is re-purposed to that the data frame includes ranging measurement information. By way of example, the bit 864 may be in the Legacy preamble, so that the approach works for IEEE 802.11a, IEEE 802.11n, IEEE 802.11ac, IEEE 802.11ax and future Extremely High Throughput (EHT) frames. In some implementations, the bit 864 may be in preambles for the High Throughput (HT) (IEEE 802.11n), the Very High Throughput (VHT) (IEEE 802.11ac), or High Efficiency (HE) (IEEE 802.11ax).

While RTT techniques may be used to determine a given device's location relative to another device, the given device may need to perform ranging operations with three other devices to determine its actual position. A device may perform a ranging operation with at least three other devices having known locations, and use known trilateration techniques to estimate its location. As ranging operation 800 uses data frames, and a wireless device, e.g., initiating device D1, may be connected with and exchange data frames with one wireless device at a time, in some implementations, ranging operation 800 is used with only one wireless device (with which data frames are exchanged) and ranging operations using FTM or NDP, e.g., as illustrated in FIGS. 4A-7 may be performed with other wireless devices. The use of data frames for the ranging operation with one of the wireless devices decreases overhead while maintaining security.

Figure 9:
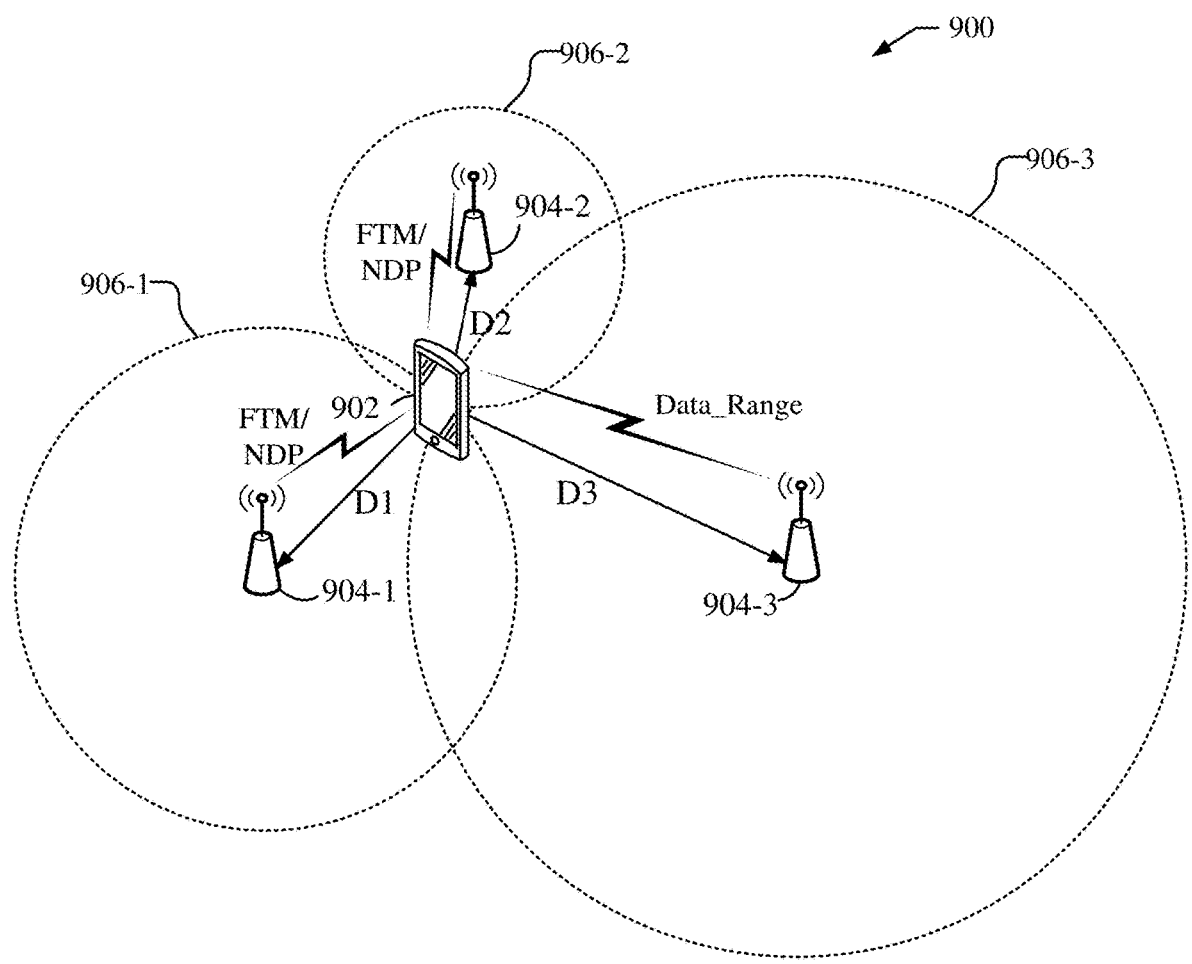
FIG. 9 shows a wireless device performing ranging operations using data frames with one wireless device and using FTM frames or NDP frames with other wireless devices to determine an estimate of a position.

FIG. 9, for example, illustrates a positioning process 900 for a wireless device 902 using ranging to multiple wireless devices 904-1, 904-2, and 904-3. As illustrated, the wireless device 902 may performing ranging operations using FTM or NDP protocols (as discussed herein at FIGS. 4A-7) with wireless devices 904-1 and 904-2 to determine respective ranges D1 and D2. The wireless device 902 may be engaged in data communications with wireless device 904-3 and may use data frames for a ranging operation, e.g., as illustrated in FIGS. 8A and 8B, with the wireless device 904-3 to determine range D3. The ranges D1, D2, and D3 define circles 906-1, 906-2, and 906-3 around each of the wireless devices 904-1, 904-2, and 904-3, which may be used, along with known positions of wireless devices 904-1, 904-2, and 904-3 to determine an estimated position of the wireless device 902 using trilateration.

Figure 10:
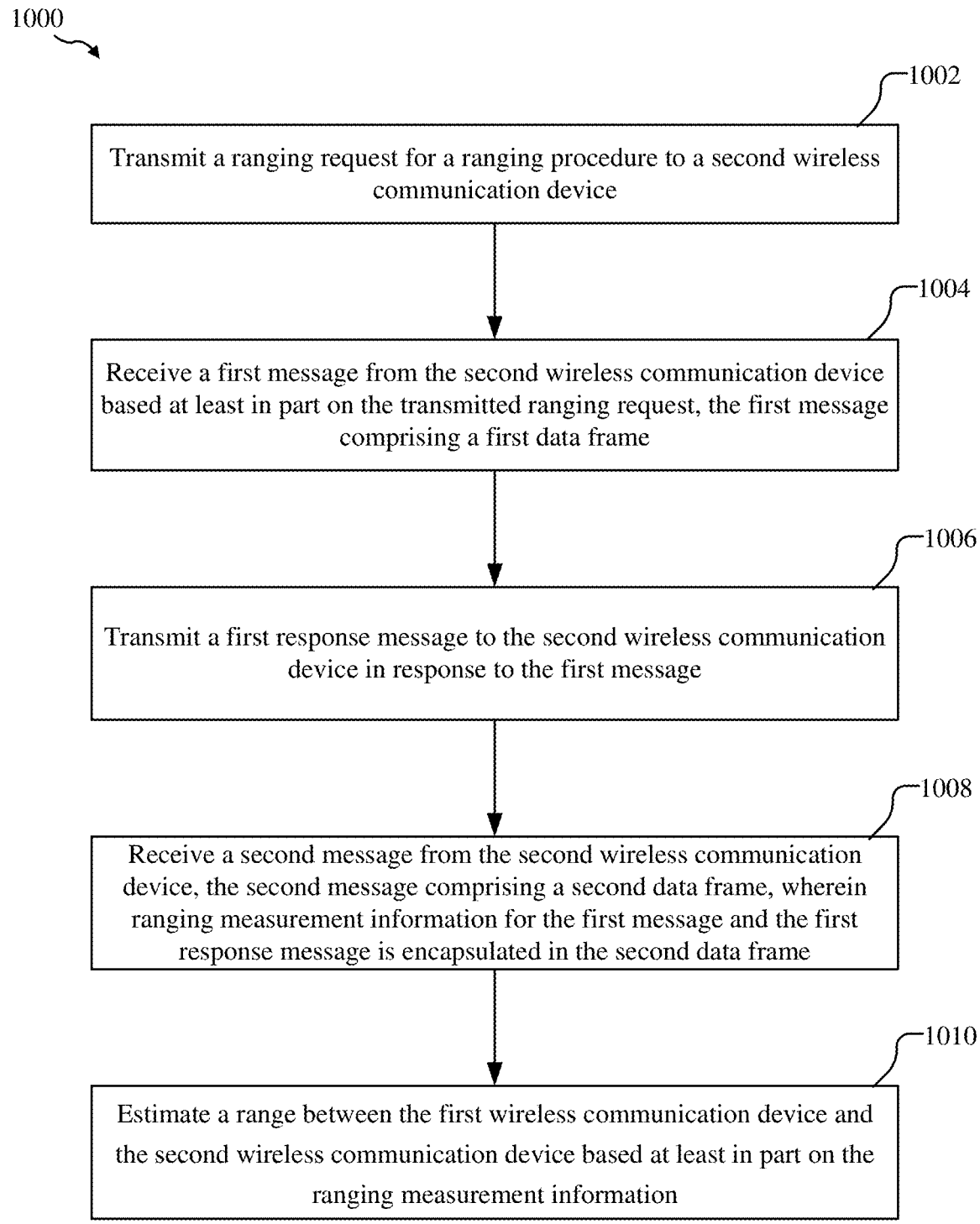
FIG. 10 shows a flowchart for an exemplary method for wireless communications including a ranging operation using data frames.

FIG. 10 shows a flowchart for an exemplary method 1000 for ranging performed by a first wireless communication device, such as wireless device 200, in a manner consistent with disclosed implementation.

At block 1002, the first wireless communication device may transmit a ranging request for a ranging procedure to a second wireless communication device, e.g., as discussed at ranging request 802 of FIG. 8A. The ranging request may be initial fine timing measurement request (iFTMR) frame, a Probe Request or other type of message. The processor 230, transceivers 211, and the memory 240 may comprise a means for transmitting a ranging request for a ranging procedure to a second wireless communication device.

At block 1004, the first wireless communication device receives a first message from the second wireless communication device based at least in part on the transmitted ranging request, the first message comprising a first data frame, e.g., as discussed at data frame 810 of FIG. 8A. The first data frame, for example, may be encrypted. The processor 230, transceivers 211, and the memory 240 may comprise a means for receiving a first message from the second wireless communication device based at least in part on the transmitted ranging request, the first message comprising a first data frame.

At block 1006, the first wireless communication device transmits a first response message to the second wireless communication device in response to the first message, e.g., as discussed at ACK frame 812 of FIG. 8A. The processor 230, transceivers 211, and the memory 240 may comprise a means for transmitting a first response message to the second wireless communication device in response to the first message.

At block 1008, the first wireless communication device receives a second message from the second wireless communication device, the second message comprising a second data frame, wherein ranging measurement information for the first message and the first response message is encapsulated in the second data frame, e.g., as discussed at data frame 814 of FIG. 8A. The second data frame, for example, may be encrypted. The ranging measurement information, for example, may include a time of departure (TOD) of the first message from the second wireless communication device and a time of arrival (TOA) of the first response message at the second wireless communication device. The TOD of the first message may be a first timestamp in the ranging measurement information and the TOA of the first response message may be a second timestamp in the ranging measurement information, such as discussed in FIG. 8B. The ranging measurement information may further include token information, such as discussed in FIG. 8B. In some implementations, the second message may include a bit that is set to indicate presence of the ranging measurement information, e.g., as discussed in FIG. 8B. The processor 230, transceivers 211, and the memory 240 may comprise a means for receiving a second message from the second wireless communication device, the second message comprising a second data frame, wherein ranging measurement information for the first message and the first response message is encapsulated in the second data frame.

At block 1010, the first wireless communication device estimates a range between the first wireless communication device and the second wireless communication device based at least in part on the ranging measurement information, e.g., as discussed in FIG. 8A. In some implementations, the range may be estimated by determining at least one round trip time (RTT) and may be based at least in part on the time of departure (TOD) of the first message from the second wireless communication device and the time of arrival (TOA) of the first of the first response message at the second wireless communication device, as well as the TOA of the first message at the first wireless communication device and the TOD of the first response message from the first wireless communication device. The processor 230, transceivers 211, and the memory 240 may comprise a means for estimating a range between the first wireless communication device and the second wireless communication device based at least in part on the ranging measurement information.

In one implementation, the method 1000 may further include the first wireless communication device receiving a plurality of messages from the second wireless communication device including the first message and the second message, wherein each of the plurality of messages is a data frame, e.g., as discussed at data frames 810 and 814 in FIG. 8A. Each message in the plurality of messages may include the ranging measurement information for an immediately previous message and response message encapsulated in the data frame, e.g., as discussed in FIG. 8A. The first wireless communication device may transmit a plurality of response messages to the second wireless communication device including the first response message, each response message in the plurality of response messages is in response to a received message, e.g., as discussed at ACK frames 812 and 816 in FIG. 8A. The first wireless communication device may estimate the range between the first wireless communication device and the second wireless communication device further based at least in part on all of the ranging measurement information, e.g., as discussed in FIG. 8A. The processor 230, transceivers 211, and the memory 240 may comprise a means for receiving a plurality of messages from the second wireless communication device including the first message and the second message, wherein each of the plurality of messages is a data frame and a means for transmitting a plurality of response messages to the second wireless communication device including the first response message, each response message in the plurality of response messages is in response to a received message.

In one implementation, the range estimated between the first wireless communication device and the second wireless communication device is a first range estimate and the method 1000 may further include the first wireless communication device exchanging ranging messages with a third wireless communication device and a fourth wireless communication device, wherein the ranging messages comprise one of Fine Timing Measurement (FTM) frames or a null data packet (NDP) frame, e.g., as discussed in FIG. 9. The first wireless communication device may generate a second range estimate between the first wireless communication device and the third wireless communication device and a third range estimate between the first wireless communication device and the fourth wireless communication device, e.g., as discussed in FIG. 9. The first wireless communication device may estimate a position of the first wireless communication device based on the first range estimate, the second range estimate, and the third range estimate, e.g., as discussed in FIG. 9. The processor 230, transceivers 211, and the memory 240 may comprise a means for exchanging ranging messages with a third wireless communication device and a fourth wireless communication device, wherein the ranging messages comprise one of Fine Timing Measurement (FTM) frames or a null data packet (NDP) frame. The processor 230, transceivers 211, and the memory 240 may comprise a means for generating a second range estimate between the first wireless communication device and the third wireless communication device and a third range estimate between the first wireless communication device and the fourth wireless communication device. The processor 230, transceivers 211, and the memory 240 may comprise a means for estimating a position of the first wireless communication device based on the first range estimate, the second range estimate, and the third range estimate.

Figure 11:
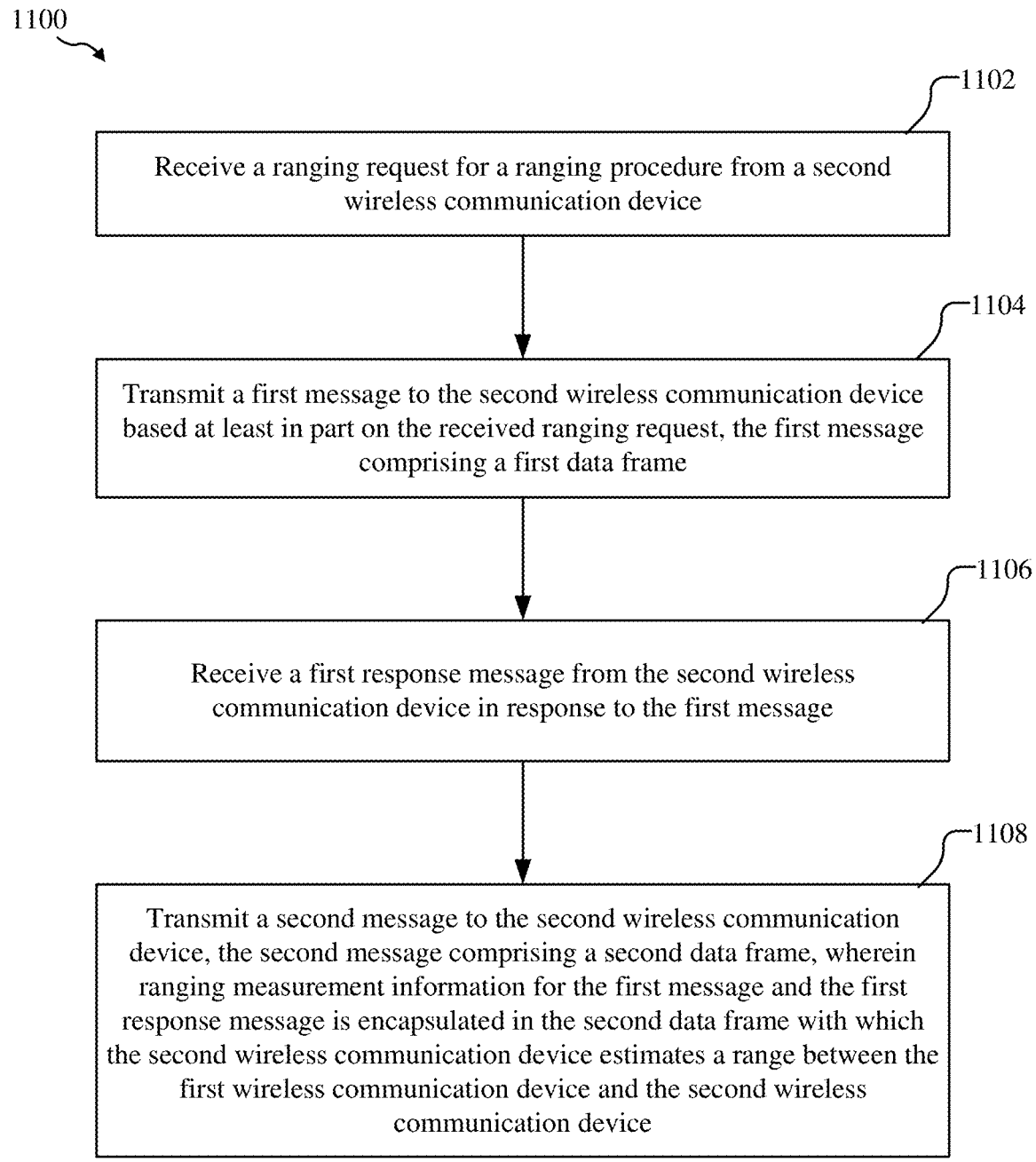
FIG. 11 shows a flowchart for another exemplary method for wireless communications including a ranging operation using data frames.

FIG. 11 shows a flowchart for an exemplary method 1100 for ranging performed by a first wireless communication device, such as wireless device 200, in a manner consistent with disclosed implementation.

At block 1102, the first wireless communication device may receive a ranging request for a ranging procedure from a second wireless communication device, e.g., as discussed at ranging request 802 of FIG. 8A. The ranging request may be initial fine timing measurement request (iFTMR) frame, a Probe Request or other type of message. The processor 230, transceivers 211, and the memory 240 may comprise a means for receiving a ranging request for a ranging procedure from a second wireless communication device.

At block 1104, the first wireless communication device transmit a first message to the second wireless communication device based at least in part on the received ranging request, the first message comprising a first data frame, e.g., as discussed at data frame 810 of FIG. 8A. The first data frame, for example, may be encrypted. The processor 230, transceivers 211, and the memory 240 may comprise a means for transmitting a first message to the second wireless communication device based at least in part on the received ranging request, the first message comprising a first data frame.

At block 1106, the first wireless communication device receive a first response message from the second wireless communication device in response to the first message, e.g., as discussed at ACK frame 812 of FIG. 8A. The processor 230, transceivers 211, and the memory 240 may comprise a means for receiving a first response message from the second wireless communication device in response to the first message.

At block 1108, the first wireless communication device transmits a second message to the second wireless communication device, the second message comprising a second data frame, wherein ranging measurement information for the first message and the first response message is encapsulated in the second data frame with which the second wireless communication device estimates a range between the first wireless communication device and the second wireless communication device, e.g., as discussed at data frame 814 of FIG. 8A. The second data frame, for example, may be encrypted. The ranging measurement information, for example, may include a time of departure (TOD) of the first message from the first wireless communication device and a time of arrival (TOA) of the first response message at the first wireless communication device. The TOD of the first message may be a first timestamp in the ranging measurement information and the TOA of the first response message may be a second timestamp in the ranging measurement information, such as discussed in FIG. 8B. The ranging measurement information may further include token information, such as discussed in FIG. 8B. In some implementations, the second message may include a bit that is set to indicate presence of the ranging measurement information, e.g., as discussed in FIG. 8B. The processor 230, transceivers 211, and the memory 240 may comprise a means for transmitting a second message to the second wireless communication device, the second message comprising a second data frame, wherein ranging measurement information for the first message and the first response message is encapsulated in the second data frame with which the second wireless communication device estimates a range between the first wireless communication device and the second wireless communication device.

In one implementation, the method 1100 may further include the first wireless communication device transmitting a plurality of messages to the second wireless communication device including the first message and the second message, wherein each of the plurality of messages is a data frame, e.g., as discussed at data frames 810 and 814 in FIG. 8A. Each message in the plurality of messages may include the ranging measurement information for an immediately previous message and response message encapsulated in the data frame, e.g., as discussed in FIG. 8A. The first wireless communication device may receive a plurality of response messages from the second wireless communication device including the first response message, each response message in the plurality of response messages is in response to a transmitted message, e.g., as discussed at ACK frame 812 and 816 in FIG. 8A. The processor 230, transceivers 211, and the memory 240 may comprise a means for transmitting a plurality of messages to the second wireless communication device including the first message and the second message, wherein each of the plurality of messages is a data frame and a means for receiving a plurality of response messages from the second wireless communication device including the first response message, each response message in the plurality of response messages is in response to a transmitted message.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses:

Clause 1. A method performed by a first wireless communication device for ranging, comprising: transmitting a ranging request for a ranging procedure to a second wireless communication device; receiving a first message from the second wireless communication device based at least in part on the transmitted ranging request, the first message comprising a first data frame; transmitting a first response message to the second wireless communication device in response to the first message; receiving a second message from the second wireless communication device, the second message comprising a second data frame, wherein ranging measurement information for the first message and the first response message is encapsulated in the second data frame; and estimating a range between the first wireless communication device and the second wireless communication device based at least in part on the ranging measurement information.

Clause 2. The method of clause 1, wherein the ranging measurement information comprises a time of departure of the first message from the second wireless communication device and a time of arrival of the first response message at the second wireless communication device.

Clause 3. The method of clause 2, wherein estimating the range comprises determining at least one round trip time (RTT) and is further based at least in part on a time of arrival of the first message measured at the first wireless communication device, and a time of departure of the first response message from the first wireless communication device.

Clause 4. The method of any of clauses 2-3, wherein the time of departure of the first message is a first timestamp in the ranging measurement information and the time of arrival of the first response message is a second timestamp in the ranging measurement information.

Clause 5. The method of clause 4, wherein the ranging measurement information further comprises token information.

Clause 6. The method of any of clauses 1-5, wherein the first data frame and the second data frame are encrypted.

Clause 7. The method of any of clauses 1-6, wherein the second message from the second wireless communication device further comprises a bit that is set to indicate presence of the ranging measurement information.

Clause 8. The method of any of clauses 1-7, further comprising: receiving a plurality of messages from the second wireless communication device including the first message and the second message, wherein each of the plurality of messages is a data frame; transmitting a plurality of response messages to the second wireless communication device including the first response message, each response message in the plurality of response messages is in response to a received message; wherein each message in the plurality of messages comprises the ranging measurement information for an immediately previous message and response message encapsulated in the data frame; and wherein estimating the range between the first wireless communication device and the second wireless communication device is further based at least in part on all of the ranging measurement information.

Clause 9. The method of any of clauses 1-8, wherein the range estimated between the first wireless communication device and the second wireless communication device is a first range estimate, the method further comprising: exchanging ranging messages with a third wireless communication device and a fourth wireless communication device, wherein the ranging messages comprise one of Fine Timing Measurement (FTM) frames or a null data packet (NDP) frame; generating a second range estimate between the first wireless communication device and the third wireless communication device and a third range estimate between the first wireless communication device and the fourth wireless communication device; and estimating a position of the first wireless communication device based on the first range estimate, the second range estimate, and the third range estimate.

Clause 10. A first wireless communication device configured for ranging, comprising: a wireless transceiver; at least one memory; at least one processor coupled to the wireless transceiver and the at least one memory, wherein the at least one processor is configured to: transmit, via the wireless transceiver, a ranging request for a ranging procedure to a second wireless communication device; receive, via the wireless transceiver, a first message from the second wireless communication device based at least in part on the transmitted ranging request, the first message comprising a first data frame; transmit, via the wireless transceiver, a first response message to the second wireless communication device in response to the first message; receive, via the wireless transceiver, a second message from the second wireless communication device, the second message comprising a second data frame, wherein ranging measurement information for the first message and the first response message is encapsulated in the second data frame; and estimate a range between the first wireless communication device and the second wireless communication device based at least in part on the ranging measurement information.

Clause 11. The first wireless communication device of clause 10, wherein the ranging measurement information comprises a time of departure of the first message from the second wireless communication device and a time of arrival of the first response message at the second wireless communication device.

Clause 12. The first wireless communication device of clause 11, wherein the at least one processor is configured to estimate the range by being configured to determine at least one round trip time (RTT) and is further based at least in part on a time of arrival of the first message measured at the first wireless communication device, and a time of departure of the first response message from the first wireless communication device.

Clause 13. The first wireless communication device of any of clauses 11-12, wherein the time of departure of the first message is a first timestamp in the ranging measurement information and the time of arrival of the first response message is a second timestamp in the ranging measurement information.

Clause 14. The first wireless communication device of clause 13, wherein the ranging measurement information further comprises token information.

Clause 15. The first wireless communication device of any of clauses 10-14, wherein the first data frame and the second data frame are encrypted.

Clause 16. The first wireless communication device of any of clauses 10-15, wherein the second message from the second wireless communication device further comprises a bit that is set to indicate presence of the ranging measurement information.

Clause 17. The first wireless communication device of any of clauses 10-16, wherein the at least one processor is further configured to: receive, via the wireless transceiver, a plurality of messages from the second wireless communication device including the first message and the second message, wherein each of the plurality of messages is a data frame; transmit, via the wireless transceiver, a plurality of response messages to the second wireless communication device including the first response message, each response message in the plurality of response messages is in response to a received message; wherein each message in the plurality of messages comprises the ranging measurement information for an immediately previous message and response message encapsulated in the data frame; and wherein the at least one processor is configured to estimate the range between the first wireless communication device and the second wireless communication device further based at least in part on all of the ranging measurement information.

Clause 18. The first wireless communication device of any of clauses 10-17, wherein the range estimated between the first wireless communication device and the second wireless communication device is a first range estimate, wherein the at least one processor is further configured to: exchange, via the wireless transceiver, ranging messages with a third wireless communication device and a fourth wireless communication device, wherein the ranging messages comprise one of Fine Timing Measurement (FTM) frames or a null data packet (NDP) frame; generate a second range estimate between the first wireless communication device and the third wireless communication device and a third range estimate between the first wireless communication device and the fourth wireless communication device;

and estimate a position of the first wireless communication device based on the first range estimate, the second range estimate, and the third range estimate.

Clause 19. A first wireless communication device configured for ranging, comprising: means for transmitting a ranging request for a ranging procedure to a second wireless communication device; means for receiving a first message from the second wireless communication device based at least in part on the transmitted ranging request, the first message comprising a first data frame; means for transmitting a first response message to the second wireless communication device in response to the first message; means for receiving a second message from the second wireless communication device, the second message comprising a second data frame, wherein ranging measurement information for the first message and the first response message is encapsulated in the second data frame; and means for estimating a range between the first wireless communication device and the second wireless communication device based at least in part on the ranging measurement information.

Clause 20. The first wireless communication device of clause 19, wherein the ranging measurement information comprises a time of departure of the first message from the second wireless communication device and a time of arrival of the first response message at the second wireless communication device.

Clause 21. The first wireless communication device of clause 20, wherein the means for estimating the range determines at least one round trip time (RTT) and is further based at least in part on a time of arrival of the first message measured at the first wireless communication device, and a time of departure of the first response message from the first wireless communication device.

Clause 22. The first wireless communication device of any of clauses 20-21, wherein the time of departure of the first message is a first timestamp in the ranging measurement information and the time of arrival of the first response message is a second timestamp in the ranging measurement information.

Clause 23. The first wireless communication device of clause 22, wherein the ranging measurement information further comprises token information.

Clause 24. The first wireless communication device of any of clauses 19-23, wherein the first data frame and the second data frame are encrypted.

Clause 25. The first wireless communication device of any of clauses 19-24, wherein the second message from the second wireless communication device further comprises a bit that is set to indicate presence of the ranging measurement information.

Clause 26. The first wireless communication device of any of clauses 19-25, further comprising: means for receiving a plurality of messages from the second wireless communication device including the first message and the second message, wherein each of the plurality of messages is a data frame; means for transmitting a plurality of response messages to the second wireless communication device including the first response message, each response message in the plurality of response messages is in response to a received message; wherein each message in the plurality of messages comprises the ranging measurement information for an immediately previous message and response message encapsulated in the data frame; and wherein the range between the first wireless communication device and the second wireless communication device is further based at least in part on all of the ranging measurement information.

Clause 27. The first wireless communication device of any of clauses 19-26, wherein the range estimated between the first wireless communication device and the second wireless communication device is a first range estimate, the first wireless communication device further comprising: means for exchanging ranging messages with a third wireless communication device and a fourth wireless communication device, wherein the ranging messages comprise one of Fine Timing Measurement (FTM) frames or a null data packet (NDP) frame; means for generating a second range estimate between the first wireless communication device and the third wireless communication device and a third range estimate between the first wireless communication device and the fourth wireless communication device; and means for estimating a position of the first wireless communication device based on the first range estimate, the second range estimate, and the third range estimate.

Clause 28. A non-transitory storage medium including program code stored thereon, the program code is operable to configure at least one processor in a first wireless communication device for ranging, the program code comprising instructions to: transmit a ranging request for a ranging procedure to a second wireless communication device; receive a first message from the second wireless communication device based at least in part on the transmitted ranging request, the first message comprising a first data frame; transmit a first response message to the second wireless communication device in response to the first message; receive a second message from the second wireless communication device, the second message comprising a second data frame, wherein ranging measurement information for the first message and the first response message is encapsulated in the second data frame; and estimate a range between the first wireless communication device and the second wireless communication device based at least in part on the ranging measurement information.

Clause 29. The non-transitory storage medium of clause 28, wherein the ranging measurement information comprises a time of departure of the first message from the second wireless communication device and a time of arrival of the first response message at the second wireless communication device.

Clause 30. The non-transitory storage medium of clause 29, wherein the instructions to estimate the range determines at least one round trip time (RTT) and is further based at least in part on a time of arrival of the first message measured at the first wireless communication device, and a time of departure of the first response message from the first wireless communication device.

Clause 31. The non-transitory storage medium of any of clauses 29-30, wherein the time of departure of the first message is a first timestamp in the ranging measurement information and the time of arrival of the first response message is a second timestamp in the ranging measurement information.

Clause 32. The non-transitory storage medium of clause 31, wherein the ranging measurement information further comprises token information.

Clause 33. The non-transitory storage medium of any of clauses 28-32, wherein the first data frame and the second data frame are encrypted.

Clause 34. The non-transitory storage medium of any of clauses 28-33, wherein the second message from the second wireless communication device further comprises a bit that is set to indicate presence of the ranging measurement information.

Clause 35. The non-transitory storage medium of any of clauses 28-34, wherein the program code further comprises instructions to: receive a plurality of messages from the second wireless communication device including the first message and the second message, wherein each of the plurality of messages is a data frame; transmit a plurality of response messages to the second wireless communication device including the first response message, each response message in the plurality of response messages is in response to a received message; wherein each message in the plurality of messages comprises the ranging measurement information for an immediately previous message and response message encapsulated in the data frame; and wherein the range between the first wireless communication device and the second wireless communication device is further based at least in part on all of the ranging measurement information.

Clause 36. The non-transitory storage medium of any of clauses 28-35, wherein the range estimated between the first wireless communication device and the second wireless communication device is a first range estimate, wherein the program code further comprises instructions to: exchange ranging messages with a third wireless communication device and a fourth wireless communication device, wherein the ranging messages comprise one of Fine Timing Measurement (FTM) frames or a null data packet (NDP) frame; generate a second range estimate between the first wireless communication device and the third wireless communication device and a third range estimate between the first wireless communication device and the fourth wireless communication device; and estimate a position of the first wireless communication device based on the first range estimate, the second range estimate, and the third range estimate.

Clause 37. A method performed by a first wireless communication device for ranging, comprising: receiving a ranging request for a ranging procedure from a second wireless communication device; transmitting a first message to the second wireless communication device based at least in part on the received ranging request, the first message comprising a first data frame; receiving a first response message from the second wireless communication device in response to the first message; and transmitting a second message to the second wireless communication device, the second message comprising a second data frame, wherein ranging measurement information for the first message and the first response message is encapsulated in the second data frame with which the second wireless communication device estimates a range between the first wireless communication device and the second wireless communication device.

Clause 38. The method of clause 37, wherein the ranging measurement information comprises a time of departure of the first message from the first wireless communication device and a time of arrival of the first response message at the first wireless communication device.

Clause 39. The method of clause 38, wherein the time of departure of the first message is a first timestamp in the ranging measurement information and the time of arrival of the first response message is a second timestamp in the ranging measurement information.

Clause 40. The method of clause 39, wherein the ranging measurement information further comprises token information.

Clause 41. The method of any of clauses 37-40, wherein the first data frame and the second data frame are encrypted.

Clause 42. The method of any of clauses 37-41, wherein the second message from the first wireless communication device further comprises a bit that is set to indicate presence of the ranging measurement information.

Clause 43. The method of any of clauses 37-42, further comprising: transmitting a plurality of messages to the second wireless communication device including the first message and the second message, wherein each of the plurality of messages is a data frame; and receiving a plurality of response messages from the second wireless communication device including the first response message, each response message in the plurality of response messages is in response to a transmitted message; wherein each message in the plurality of messages comprises the ranging measurement information for an immediately previous message and response message encapsulated in the data frame.

Clause 44. A first wireless communication device configured for ranging, comprising: a wireless transceiver; at least one memory; at least one processor coupled to the wireless transceiver and the at least one memory, wherein the at least one processor is configured to: receive, via the wireless transceiver, a ranging request for a ranging procedure from a second wireless communication device; transmit, via the wireless transceiver, a first message to the second wireless communication device based at least in part on the received ranging request, the first message comprising a first data frame; receive, via the wireless transceiver, a first response message from the second wireless communication device in response to the first message; and transmit, via the wireless transceiver, a second message to the second wireless communication device, the second message comprising a second data frame, wherein ranging measurement information for the first message and the first response message is encapsulated in the second data frame with which the second wireless communication device estimates a range between the first wireless communication device and the second wireless communication device.

Clause 45. The first wireless communication device of clause 44, wherein the ranging measurement information comprises a time of departure of the first message from the first wireless communication device and a time of arrival of the first response message at the first wireless communication device.

Clause 46. The first wireless communication device of clause 45, wherein the time of departure of the first message is a first timestamp in the ranging measurement information and the time of arrival of the first response message is a second timestamp in the ranging measurement information.

Clause 47. The first wireless communication device of clause 46, wherein the ranging measurement information further comprises token information.

Clause 48. The first wireless communication device of any of clauses 44-47, wherein the first data frame and the second data frame are encrypted.

Clause 49. The first wireless communication device of any of clauses 44-48, wherein the second message from the first wireless communication device further comprises a bit that is set to indicate presence of the ranging measurement information.

Clause 50. The first wireless communication device of any of clauses 44-49, wherein the at least one processor is further configured to: transmit, via the wireless transceiver, a plurality of messages to the second wireless communication device including the first message and the second message, wherein each of the plurality of messages is a data frame; and receive, via the wireless transceiver, a plurality of response messages from the second wireless communication device including the first response message, each response message in the plurality of response messages is in response to a transmitted message; wherein each message in the plurality of messages comprises the ranging measurement information for an immediately previous message and response message encapsulated in the data frame.

Clause 51. A first wireless communication device configured for ranging, comprising: means for receiving a ranging request for a ranging procedure from a second wireless communication device; means for transmitting a first message to the second wireless communication device based at least in part on the received ranging request, the first message comprising a first data frame; means for receiving a first response message from the second wireless communication device in response to the first message; and means for transmitting a second message to the second wireless communication device, the second message comprising a second data frame, wherein ranging measurement information for the first message and the first response message is encapsulated in the second data frame with which the second wireless communication device estimates a range between the first wireless communication device and the second wireless communication device.

Clause 52. The first wireless communication device of clause 51, wherein the ranging measurement information comprises a time of departure of the first message from the first wireless communication device and a time of arrival of the first response message at the first wireless communication device.

Clause 53. The first wireless communication device of clause 52, wherein the time of departure of the first message is a first timestamp in the ranging measurement information and the time of arrival of the first response message is a second timestamp in the ranging measurement information.

Clause 54. The first wireless communication device of clause 53, wherein the ranging measurement information further comprises token information.

Clause 55. The first wireless communication device of any of clauses 51-54, wherein the first data frame and the second data frame are encrypted.

Clause 56. The first wireless communication device of any of clauses 51-55, wherein the second message from the first wireless communication device further comprises a bit that is set to indicate presence of the ranging measurement information.

Clause 57. The first wireless communication device of any of clauses 51-56, further comprising: means for transmitting a plurality of messages to the second wireless communication device including the first message and the second message, wherein each of the plurality of messages is a data frame; and means for receiving a plurality of response messages from the second wireless communication device including the first response message, each response message in the plurality of response messages is in response to a transmitted message; wherein each message in the plurality of messages comprises the ranging measurement information for an immediately previous message and response message encapsulated in the data frame.

Clause 58. A non-transitory storage medium including program code stored thereon, the program code is operable to configure at least one processor in a first wireless communication device configured for ranging, wherein the program code comprises instructions to: receive a ranging request for a ranging procedure from a second wireless communication device; transmit a first message to the second wireless communication device based at least in part on the received ranging request, the first message comprising a first data frame; receive a first response message from the second wireless communication device in response to the first message; and transmit a second message to the second wireless communication device, the second message comprising a second data frame, wherein ranging measurement information for the first message and the first response message is encapsulated in the second data frame with which the second wireless communication device estimates a range between the first wireless communication device and the second wireless communication device.

Clause 59. The non-transitory storage medium of clause 58, wherein the ranging measurement information comprises a time of departure of the first message from the first wireless communication device and a time of arrival of the first response message at the first wireless communication device.

Clause 60. The non-transitory storage medium of clause 59, wherein the time of departure of the first message is a first timestamp in the ranging measurement information and the time of arrival of the first response message is a second timestamp in the ranging measurement information.

Clause 61. The non-transitory storage medium of clause 60, wherein the ranging measurement information further comprises token information.

Clause 62. The non-transitory storage medium of any of clauses 58-61, wherein the first data frame and the second data frame are encrypted.

Clause 63. The non-transitory storage medium of any of clauses 58-62, wherein the second message from the first wireless communication device further comprises a bit that is set to indicate presence of the ranging measurement information.

Clause 64. The non-transitory storage medium of any of clauses 58-63, wherein the program code further comprises instructions to: transmit a plurality of messages to the second wireless communication device including the first message and the second message, wherein each of the plurality of messages is a data frame; and receive a plurality of response messages from the second wireless communication device including the first response message, each response message in the plurality of response messages is in response to a transmitted message; wherein each message in the plurality of messages comprises the ranging measurement information for an immediately previous message and response message encapsulated in the data frame.

Therefore, it is intended that claimed subject matter not be limited to the particular examples disclosed, but that such claimed subject matter may also include all aspects falling within the scope of appended claims, and equivalents thereof.

What is claimed is:

1. A method performed by a first wireless communication device for ranging, comprising:
    transmitting a ranging request for a ranging procedure to a second wireless communication device;
    receiving a first message from the second wireless communication device based at least in part on the transmitted ranging request, the first message comprising an encrypted first data frame having a first preamble and a first data payload;
    transmitting a first response message to the second wireless communication device in response to the first message;
    receiving a second message from the second wireless communication device, the second message comprising an encrypted second data frame having a second preamble and a second data payload, wherein ranging measurement information for the first message and the first response message is encapsulated in the second data payload of the encrypted second data frame, and wherein the encrypted second data frame comprises a carrier frequency offset (CFO) field having a clock offset; and estimating a range between the first wireless communication device and the second wireless communication device based at least in part on the ranging measurement information and the clock offset.

2. The method of claim 1, wherein the ranging measurement information comprises a first time of departure of the first message from the second wireless communication device and a second time of arrival of the first response message at the second wireless communication device.

3. The method of claim 2, wherein estimating the range comprises determining at least one round trip time (RTT) and is further based at least in part on a third time of arrival of the first message measured at the first wireless communication device, and a fourth time of departure of the first response message from the first wireless communication device.

4. The method of claim 2, wherein the first time of departure of the first message is a first timestamp in the ranging measurement information and the second time of arrival of the first response message is a second timestamp in the ranging measurement information, wherein the ranging measurement information further comprises token information.

5. The method of claim 1, wherein the first response message comprises an acknowledgement (ACK) frame.

6. The method of claim 1, wherein the second message from the second wireless communication device further comprises a bit that is set to indicate presence of the ranging measurement information.

7. The method of claim 1, further comprising:
receiving a plurality of messages from the second wireless communication device including the first message and the second message, wherein each of the plurality of messages comprises a data frame; and
transmitting a plurality of response messages to the second wireless communication device including the first response message, each response message in the plurality of response messages is in response to a received message,
wherein each message in the plurality of messages comprises the ranging measurement information for an immediately previous message and response message encapsulated in the data frame, and
wherein estimating the range between the first wireless communication device and the second wireless communication device is further based at least in part on all of the ranging measurement information.

8. The method of claim 1, wherein the range estimated between the first wireless communication device and the second wireless communication device is a first range estimate, the method further comprising:
exchanging ranging messages with a third wireless communication device and a fourth wireless communication device, wherein the ranging messages comprise one of Fine Timing Measurement (FTM) frames or a null data packet (NDP) frame;
generating a second range estimate between the first wireless communication device and the third wireless communication device and a third range estimate between the first wireless communication device and the fourth wireless communication device; and estimating a position of the first wireless communication device based on the first range estimate, the second range estimate, and the third range estimate.

9. A first wireless communication device configured for ranging, comprising:
a wireless transceiver;
at least one memory; and
at least one processor coupled to the wireless transceiver and the at least one memory, wherein the at least one processor, implemented together or separately, is configured to:
transmit, via the wireless transceiver, a ranging request for a ranging procedure to a second wireless communication device;
receive, via the wireless transceiver, a first message from the second wireless communication device based at least in part on the transmitted ranging request, the first message comprising an encrypted first data frame having a first preamble and a first data payload;
transmit, via the wireless transceiver, a first response message to the second wireless communication device in response to the first message;
receive, via the wireless transceiver, a second message from the second wireless communication device, the second message comprising an encrypted second data frame having a second preamble and a second data payload, wherein ranging measurement information for the first message and the first response message is encapsulated in the second data payload of the second data frame, and wherein the encrypted second data frame comprises a carrier frequency offset (CFO) field having a clock offset; and
estimate a range between the first wireless communication device and the second wireless communication device based at least in part on the ranging measurement information and the clock offset.

10. The first wireless communication device of claim 9, wherein the ranging measurement information comprises a first time of departure of the first message from the second wireless communication device and a second time of arrival of the first response message at the second wireless communication device.

11. The first wireless communication device of claim 10, wherein the at least one processor, implemented together or separately, is configured to:
estimate the range by being configured to determine at least one round trip time (RTT) and is further based at least in part on a third time of arrival of the first message measured at the first wireless communication device, and a fourth time of departure of the first response message from the first wireless communication device.

12. The first wireless communication device of claim 9, wherein the first response message comprises an acknowledgement (ACK) frame.

13. The first wireless communication device of claim 9, wherein the second message from the second wireless communication device further comprises a bit that is set to indicate presence of the ranging measurement information.

14. The first wireless communication device of claim 9, wherein the at least one processor, implemented together or separately, is further configured to:
receive, via the wireless transceiver, a plurality of messages from the second wireless communication device including the first message and the second message, wherein each of the plurality of messages comprises a data frame; and transmit, via the wireless transceiver, a plurality of response messages to the second wireless communication device including the first response message, each response message in the plurality of response messages is in response to a received message, wherein each message in the plurality of messages comprises the ranging measurement information for an immediately previous message and response message encapsulated in the data frame, and wherein the at least one processor, implemented together or separately, is further configured to:
estimate the range between the first wireless communication device and the second wireless communication device further based at least in part on all of the ranging measurement information.

15. The first wireless communication device of claim 9, wherein the range estimated between the first wireless communication device and the second wireless communication device is a first range estimate, wherein the at least one processor, implemented together or separately, is further configured to:

exchange, via the wireless transceiver, ranging messages with a third wireless communication device and a fourth wireless communication device, wherein the ranging messages comprise one of Fine Timing Measurement (FTM) frames or a null data packet (NDP) frame;

generate a second range estimate between the first wireless communication device and the third wireless communication device and a third range estimate between the first wireless communication device and the fourth wireless communication device; and estimate a position of the first wireless communication device based on the first range estimate, the second range estimate, and the third range estimate.

16. A method performed by a first wireless communication device for ranging, comprising:

receiving a ranging request for a ranging procedure from a second wireless communication device;

encrypting a first data frame having a first preamble and a first data payload;

transmitting a first message to the second wireless communication device based at least in part on the received ranging request, the first message comprising the encrypted first data frame;

receiving a first response message from the second wireless communication device in response to a transmission of the first message;

encrypting a second data frame having a second preamble and a second data payload, wherein ranging measurement information for the first message and the first response message is encapsulated in the second data payload of the second data frame, wherein the second data frame is associated with an estimation of a range between the first wireless communication device and the second wireless communication device, wherein the encrypted second data frame comprises a carrier frequency offset (CFO) field having a clock offset, and wherein the estimation of a range between the first wireless communication device and the second wireless communication device is based on the clock offset; and transmitting a second message to the second wireless communication device, the second message comprising the encrypted second data frame.

17. The method of claim 16, wherein the ranging measurement information comprises a first time of departure of the first message from the first wireless communication device and a second time of arrival of the first response message at the first wireless communication device.

18. The method of claim 17, wherein the first time of departure of the first message is a first timestamp in the ranging measurement information and the second time of arrival of the first response message is a second timestamp in the ranging measurement information, wherein the ranging measurement information further comprises token information.

19. The method of claim 16, wherein the first response message comprises an acknowledgement (ACK) frame.

20. The method of claim 16, wherein the second message from the first wireless communication device further comprises a bit that is set to indicate presence of the ranging measurement information.

21. The method of claim 16, further comprising:

transmitting a plurality of messages to the second wireless communication device including the first message and the second message, wherein each of the plurality of messages comprises a data frame; and receiving a plurality of response messages from the second wireless communication device including the first response message, each response message in the plurality of response messages is in response to a transmitted message, wherein each message in the plurality of messages comprises the ranging measurement information for an immediately previous message and response message encapsulated in the data frame.

22. A first wireless communication device configured for ranging, comprising:

a wireless transceiver;

at least one memory; and at least one processor coupled to the wireless transceiver and the at least one memory, wherein the at least one processor, implemented together or separately, is configured to:

receive, via the wireless transceiver, a ranging request for a ranging procedure from a second wireless communication device;

encrypt a first data frame having a first preamble and a first data payload;

transmit, via the wireless transceiver, a first message to the second wireless communication device based at least in part on the received ranging request, the first message comprising the encrypted first data frame;

receive, via the wireless transceiver, a first response message from the second wireless communication device in response to a transmission of the first message;

encrypt a second data frame having a second preamble and a second data payload, wherein ranging measurement information for the first message and the first response message is encapsulated in the second data payload of the second data frame, wherein the second data frame is associated with an estimation of a range between the first wireless communication device and the second wireless communication device, wherein the encrypted second data frame comprises a carrier frequency offset (CFO) field having a clock offset, and wherein the estimation of a range between the first wireless communication device and the second wireless communication device is based on the clock offset; and transmit, via the wireless transceiver, a second message to the second wireless communication device, the second message comprising the encrypted second data frame.

23. The first wireless communication device of claim 22, wherein the ranging measurement information comprises a first time of departure of the first message from the first wireless communication device and a second time of arrival of the first response message at the first wireless communication device.

24. The first wireless communication device of claim 22, wherein the first response message comprises an acknowledgement (ACK) frame.

25. The first wireless communication device of claim 22, wherein the second message from the first wireless communication device further comprises a bit that is set to indicate presence of the ranging measurement information.

26. The first wireless communication device of claim 22, wherein the at least one processor, implemented together or separately, is further configured to:

transmit, via the wireless transceiver, a plurality of messages to the second wireless communication device including the first message and the second message, wherein each of the plurality of messages comprises a data frame; and receive, via the wireless transceiver, a plurality of response messages from the second wireless communication device including the first response message, each response message in the plurality of response messages is in response to a transmitted message, wherein each message in the plurality of messages comprises the ranging measurement information for an immediately previous message and response message encapsulated in the data frame.

* * * * *